United States Patent
Campbell et al.

(10) Patent No.: US 7,314,511 B2
(45) Date of Patent: Jan. 1, 2008

(54) METALOXYPHTHALOCYANINE COMPOUNDS

(75) Inventors: James Stanley Campbell, Blackley (GB); Kathryn Carr, Blackley (GB); Russell Jon Griffiths, Blackley (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 168 days.

(21) Appl. No.: 10/525,669

(22) PCT Filed: Jul. 30, 2003

(86) PCT No.: PCT/GB03/03345

§ 371 (c)(1),
(2), (4) Date: Feb. 25, 2005

(87) PCT Pub. No.: WO2004/020529

PCT Pub. Date: Mar. 11, 2004

(65) Prior Publication Data
US 2006/0000388 A1    Jan. 5, 2006

(30) Foreign Application Priority Data
Aug. 28, 2002 (GB) .................. 0219938.8

(51) Int. Cl.
*C09D 11/00* (2006.01)
*C09B 47/04* (2006.01)

(52) U.S. Cl. .................. 106/31.49; 106/31.78; 540/131; 540/140

(58) Field of Classification Search ............ 106/31.49, 106/31.78; 540/140, 131; 524/84
See application file for complete search history.

(56) References Cited

U.S. PATENT DOCUMENTS

| | | | | |
|---|---|---|---|---|
| 2,456,274 A * | 12/1948 | Gutzwiller | .................. | 540/140 |
| 3,105,070 A * | 9/1963 | Bitterli | ...................... | 540/125 |
| 3,981,734 A * | 9/1976 | Cabut et al. | ............. | 106/31.76 |
| 4,606,859 A * | 8/1986 | Duggan et al. | ............. | 540/122 |
| 4,798,781 A * | 1/1989 | Hirose et al. | .......... | 430/270.17 |
| 4,800,145 A * | 1/1989 | Nelson et al. | ............. | 430/59.4 |
| 4,824,947 A * | 4/1989 | Stark | .......................... | 540/125 |
| 5,168,031 A * | 12/1992 | Buckingham et al. | . | 430/270.16 |
| 5,282,894 A * | 2/1994 | Albert et al. | ............ | 106/31.46 |
| RE35,145 E * | 1/1996 | Stark et al. | .................. | 540/125 |
| 5,516,899 A * | 5/1996 | Campbell et al. | ............ | 540/123 |
| 5,629,417 A * | 5/1997 | Campbell et al. | ............ | 540/122 |
| 5,712,332 A * | 1/1998 | Kaieda et al. | ................ | 524/88 |
| 5,968,708 A * | 10/1999 | Yashiro et al. | ........... | 430/270.1 |
| 6,069,244 A * | 5/2000 | Masuda et al. | ............. | 540/139 |
| 6,197,851 B1* | 3/2001 | Maxwell et al. | .............. | 524/88 |
| 6,323,340 B1* | 11/2001 | Masuda et al. | ............. | 540/128 |
| 6,926,764 B2* | 8/2005 | Bleikolm et al. | ........ | 106/31.27 |
| 7,070,646 B2* | 7/2006 | Campbell | ................ | 106/31.49 |

FOREIGN PATENT DOCUMENTS

| | | |
|---|---|---|
| EP | 0155 780 | 9/1985 |
| GB | 2 237284 | 5/1991 |
| JP | 61246091 | 11/1986 |
| JP | 010100171 A2 | 4/1989 |
| JP | 050222301 A2 | 8/1993 |
| JP | 060240146 A2 | 8/1994 |
| WO | 98/08895 | 3/1998 |

* cited by examiner

*Primary Examiner*—Helene Klemanski
(74) *Attorney, Agent, or Firm*—Morgan, Lewis & Bockius LLP

(57) ABSTRACT

A phthalocyanine compound of Formula (I) wherein M is an oxymetal group, methods and uses involving these compounds

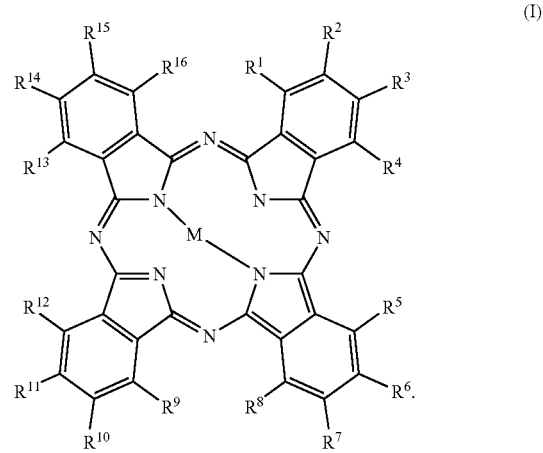

(I)

19 Claims, No Drawings

METALOXYPHTHALOCYANINE COMPOUNDS

This specification describes an invention relating to certain poly(substituted)-phthalocyanine compounds which absorb in the near infra-red region of the electro-magnetic spectrum, e.g. from 750 to 1500 nm, and more especially from 750 to 1100 nm, to the use of the compounds in a variety of applications where it is desirable to absorb infra-red radiation including systems and compositions providing protection against the effects of such radiation or requiring localised heat input and to systems and compositions incorporating the compounds.

EP 0155780 describes various generic classes of infra-red absorbing phthalocyanine compounds in which (a) each of at least five of the peripheral carbon atoms in the 1, 4, 5, 8, 9, 12, 13 & 16 positions of the phthalocyanine nucleus shown in Formula A

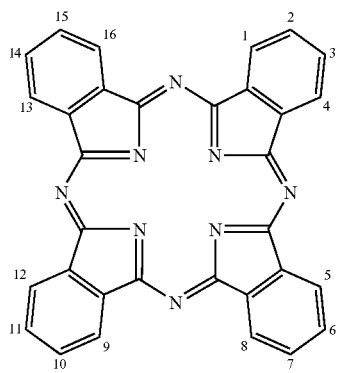

Formula A (these eight positions being hereinafter referred to as the "3,6-" positions by analogy with the equivalent 3- and 6-positions in the four molecules of phthalonitrile from which the phthalocyanine is derivable) is linked by an atom from Group VB or Group VIB of the periodic Table (other than oxygen) to a carbon atom of an organic radical and (b) the phthalocyanine nucleus is metal free or is complexed with a metal or oxy-metal. The only specific disclosure of such a compound carrying an oxy-metal is octa-3,6-(4-t-butylphenylthio)-VOPc (in which VOPc represents a phthalocyanine nucleus complexed with the oxymetal group VO and each of the eight peripheral carbon atoms in the "3,6-" positions on the phthalocyanine carries a 4-t-butylphenylthio group). Apart from being an infra-red absorber, no other properties are disclosed for this specific compound.

Although the compounds disclosed in EP 0155780 have a strong absorption peak in the near infra-red region of the electromagnetic spectrum and some have been commercialised, they generally exhibit some absorption in the visible region of the spectrum (because the position of the infra-red absorption peak is close to the visible region) and thus have a faint coloration, when applied to a substrate, which is detectable to the eye unless masked with another coloured species.

WO 98/08895 discloses the specific compound tetra-3-(4-methylphenylthio)-tetra-6-(NH-cyclohexyl) VOPc, however the compound is only disclosed in the context of plastic moulding. GB 2237284 discloses the specific compound octa-3,6-(thiophenyl)VOPc, however this is only disclosed in the context of optical recording media. JP 61-246091 discloses the specific compounds octa-3,6-(thiophenyl) VOPc, octa-3,6-(thiomethyl)TiOPc and octa-3,6-(thioethyl) VOPc, however these are only disclosed in the context of optical recording media.

According to a first aspect of the present invention there is provided a phthalocyanine compound of Formula I

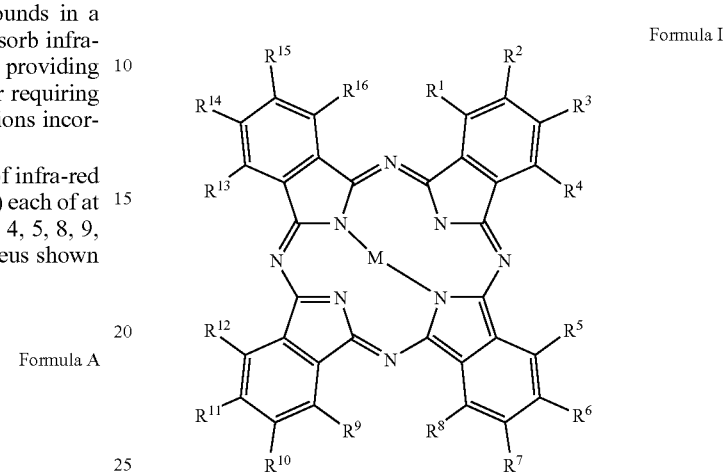

Formula I wherein at least 5 of the groups represented by $R^1$, $R^4$, $R^5$, $R^8$, $R^9$, $R^{12}$, $R^{13}$ & $R^{16}$ are independently —X-J or —X-L-$X^1$—, wherein each J is independently selected from $C_{1-6}$-alkyl; $C_{2-6}$-alkenyl; $C_{4-8}$-cycloalkyl (each being optionally substituted by a group selected from $C_{1-4}$-alkoxy, $C_{1-4}$-alkylthio, $C_{6-12}$-aryl, $C_{8-12}$-arylthio, $C_{1-4}$-alkylsulphonyl, $C_{1-4}$-alkylsulphonylamino, $C_{1-4}$-alkylsulphoxide, amino, mono- and di-$C_{1-4}$-alkylamino, halogen, nitro, cyano and hydroxycarbonyl (—COOH), hydroxysulphonyl (—$SO_3H$) or dihydroxyphosphonyl (—$PO_3H_2$) or $C_{1-4}$-alkyl esters thereof) and from $C_{6-12}$-aryl (optionally substituted by a group selected from $C_{1-3}$-alkyl, $C_{1-3}$-alkoxy, $C_{1-3}$-alkylthio, $C_{1-3}$-alkylsulphonyl, $C_{1-3}$-alkylsulphonylamino, $C_{1-4}$-alkylsulphoxide, amino, mono- and di-$C_{1-3}$-alkylamino, halogen, nitro, cyano and hydroxycarbonyl, hydroxysulphonyl or dihydroxyphosphonyl hydroxycarbonyl-$C_{1-3}$-alkyl, hydroxysulphonyl-$C_{1-3}$-alkyl, dihydroxyphosphonyl-$C_{1-3}$-alkyl or $C_{1-3}$-alkyl esters thereof);

each L is independently selected from $C_{1-6}$-alkylene and $C_{4-8}$-cycloalkylene (each being optionally substituted by a group selected from $C_{1-4}$-alkoxy, $C_{1-4}$-alkylthio, $C_{6-12}$-aryl, $C_{6-12}$-arylthio, $C_{1-4}$-alkylsulphonyl, $C_{1-4}$-alkylsulphonylamino, $C_{1-4}$-alkylsulphoxide, amino, mono- and di-$C_{1-4}$-alkylamino, halogen, nitro, cyano and hydroxycarbonyl, hydroxysulphonyl or dihydroxyphosphonyl or $C_{1-4}$-alkyl esters thereof); and from $C_{6-12}$-arylene (optionally substituted by a group selected from $C_{1-3}$-alkyl, $C_{1-3}$-alkoxy, $C_{1-3}$-alkylthio, $C_{1-3}$-alkylsulphonyl, $C_{1-3}$-alkylsulphonylamino, $C_{1-3}$-alkyl-sulphoxide, amino, mono- and di-$C_{1-3}$-alkylamino, halogen, nitro, cyano and hydroxycarbonyl, hydroxysulphonyl, dihydroxyphosphonyl, hydroxycarbonyl-$C_{1-3}$-alkyl, hydroxysulphonyl-$C_{1-3}$-alkyl or dihydroxyphosphonyl-$C_{1-3}$-alkyl or $C_{1-3}$-alkyl esters thereof);

M is an oxymetal group;

each X independently is S, Se, Te or NT;

each $X^1$ independently is S, Se, Te or NT and directly attached to a peripheral 3,6-carbon atom of another phthalocyanine compound of Formula I;

each T independently is H, alkyl or phenyl, or T & J, together with the N atom to which they are attached, form an aliphatic or aromatic ring provided this N atom is not positively charged; provided where J is aryl, T is not aryl; and the remaining groups from $R^1$ to $R^{16}$ are independently selected from H, halogen, —OJ, hydroxycarbonyl, hydroxysulphonyl, dihydroxyphosphonyl, hydroxycarbonyl-$C_{1-3}$-alkyl, hydroxysulphonyl-$C_{1-3}$-alkyl and dihydroxyphosphonyl-$C_{1-3}$-alkyl, provided that at least one of $R^2$ and $R^3$, at least one of $R^6$ and $R^7$, at least one of $R^{10}$ and $R^{11}$ and at least one of $R^{14}$ and $R^{15}$ is hydrogen, with the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc.

Throughout this specification the carbon atoms in the phthalocyanine compound of Formula I to which the groups $R^1$, $R^4$, $R^5$, $R^8$, $R^9$, $R^{12}$, $R^{13}$ & $R^{16}$ are attached are referred to as the "3,6-carbon atoms" by analogy with the equivalent 3- and 6-carbon atoms in the four molecules of phthalonitrile (see Formula II) from which this present phthalocyanine compound is derivable. Furthermore the symbols, $H_2Pc$ and MPc, in which M is an oxymetal group, e.g. VO, TiO or MoO, will be used to indicate unmetallised and oxymetallised phthalocyanines, respectively.

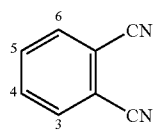

Formula II

In the phthalocyanine compound of Formula I, preferably at least six, more preferably at least seven and more especially all eight of the "3,6-carbon atoms" carry a group of the formula —X-J or —X-L-$X^1$—. It is further preferred that each "3,6-carbon atom" carries a group of formula —X-J. It is also preferred that the remaining peripheral carbon atoms (hereinafter referred to as the "4,5-carbon atoms") are unsubstituted, i.e. that each of $R^2$, $R^3$, $R^6$, $R^7$, $R^{10}$, $R^{11}$, $R^{14}$ & $R^{15}$ in Formula I is H.

Compounds of especial interest have an electronic absorption peak from 750 to 1100 nm, more preferably from 800 to 1000 nm, and those of more especial interest have at least 90% (and more especially at least 95%) of their absorption strength in the region above 400 nm at or above 750 nm. Preferred compounds have a narrow half-band width (width of band at half peak height) in solution, especially of less than 60 nm.

Preferred groups represented by J are $C_{3-6}$-alkyl, such as propyl or butyl, which may be straight or branched chain, but are preferably the former; $C_{2-4}$-alkenyl, such as vinyl or allyl; cyclohexyl; and more especially phenyl; naphtha-1-yl or naphtha-2-yl, particularly phenyl, each of which is optionally substituted as hereinbefore defined. Where a substituent on J is electron-withdrawing, such as hydroxycarbonyl, nitro or cyano, it is preferably in the ortho-position with respect to the link between J and X, so that it is not coupled into the extended conjugation system of the Pc nucleus.

Preferred groups represented by L are $C_{2-4}$-alkylene such as ethylene, prop-1,2-ylene and prop-1,3-ylene; $C_8$-cycloalkylene, such as cyclohex-1,4-ylene; phen-1,4-ylene and naphtha-1,4-ylene, each of which is optionally substituted as hereinbefore defined.

It is preferred that the aryl and/or arylene groups represented by J and L are substituted. Preferred substituents for the aryl and arylene groups represented by J and L are $C_{1-2}$-alkyl, such as methyl and ethyl; $C_{1-2}$-alkoxy such as methoxy and ethoxy; $C_{1-2}$-alkylthio, such as methylthio and ethylthio; $C_{1-2}$-alkylsulphonyl; $C_{1-2}$-alkylsulphoxide; amino; mono- and di-$C_{1-2}$-alkylamino, such as methylamino and diethylamino; halogen such as chloro or bromo; nitro; cyano; hydroxycarbonyl, hydroxysulphonyl, dihydroxyphosphonyl, hydroxycarbonyl-$C_{1-3}$-alkyl, hydroxysulphonyl-$C_{1-3}$-alkyl and dihydroxy-phosphonyl-$C_{1-3}$-alkyl and $C_{1-2}$-alkyl esters thereof, such as —COOH, —COO$C_2H_5$, —SO$_3$H, —SO$_3$CH$_3$, —PO$_3$H$_2$—CH$_2$CH$_2$COOH, —CH$_2$SO3H, —CH$_2$PO$_3$H$_2$, —CH$_2$COOCH$_3$, and —CH$_2$CH$_2$SO$_3$CH$_3$. Examples of optionally substituted aryl and arylene groups represented by J and L are phenyl, 4-methylphenyl, 2-methylphenyl, 4-i-propylphenyl, 2,4-dimethyl-phenyl, 2,5-dimethylphenyl, 3,5-dimethylphenyl, 4-methoxyphenyl, 4-methylthiophenyl, 3-(2-[methoxycarbonyl]ethyl)phenyl, 3-(hydroxycarbonyl)phenyl, 4-(hydroxysulphonyl)-phenyl, 2-chlorophenyl, 4-bromophenyl, 3,5-dichlorophenyl, naphtha-1-yl and naphtha-2-yl.

Preferred substituents for the alkyl, alkylene, alkenyl, cycloalkyl and cycloalkylene groups represented by J and L are $C_{1-2}$-alkoxy or $C_{1-2}$-alkylthio, such as methoxy, ethoxy and methylthio; $C_{6-12}$-aryl, especially phenyl or naphtha-1-yl; halo or cyano. Examples of optionally substituted alkyl, alkylene, alkenyl, cycloalkyl and cycloalkylene groups represented by J and L are methyl, ethyl, i-propyl, methoxy, ethoxy, methylthio, allyl, trifluoromethyl, benzyl, dimethylaminoethyl, methylsulphonylaminoethyl and ethylaminoethyl.

It is preferred that the groups —X-J or —X-L-$X^1$— attached to the eight "3,6-carbon atoms" are identical.

It is preferred that X and $X^1$ are sulphur (S), selenium (Se) or tellurium (Te) and more especially sulphur. If any group represented by X or $X^1$ is NT, it is preferred that the compound contains not more than four such NT groups.

Preferred groups represented by T are H; $C_{1-6}$-alkyl, especially $C_{1-4}$-alkyl, such as methyl, ethyl or propyl; or phenyl. However, where J or L is aryl, it is preferred that T on the group NT attached thereto, is not aryl. Where T & J, together with the N atom to which they are attached, form an aliphatic or aromatic ring, this is preferably piperidinyl, piperazinyl, morpholinyl or pyrrolinyl.

Examples of suitable oxy-metal groups, represented by M in Formula I are titanyl (TiO), molybdyl (MoO) and vanadyl (VO), preferred is vanadyl (VO).

A preferred compound according to the present invention conforms to the following formula:

octa-3,6-(RX)-Pc-M          Formula III wherein

M is an oxymetal group selected from VO, TiO and MoO;

Pc is the phthalocyanine nucleus;

each X is independently S, Se, Te or NT wherein T is H, $C_{1-4}$-alkyl or phenyl; and each R is independently phenyl or naphthyl each of which is optionally substituted by up to 5 groups selected from $C_{1-3}$-alkyl, $C_{1-3}$-alkoxy, $C_{1-3}$-alkylthio, $C_{1-3}$-alkylsulphonyl, $C_{1-3}$-alkylsulphonyl-amino, $C_{1-3}$-alkylsulphoxide, mino, mono- and di-$C_{1-3}$-alkylamino, halogen, nitro, cyano and hydroxycarbonyl, hydroxy-sulphonyl, dihydroxyphosphonyl, hydroxycarbonyl-$C_{1-3}$-alkyl, hydroxysulphonyl-$C_{1-3}$alkyl or hydroxyphosphonyl-$C_{1-3}$-alkyl or $C_{1-3}$-alkyl esters thereof; or R & T together form a piperidinyl, piperazinyl, morpholinyl or pyrrolinyl ring.

Examples of compounds of the present invention conforming to Formula I and Formula III are:

octa-3,6-(phenylthio)-TiOPc
octa-3,6-(4-methylphenylthio)-VOPc
octa-3,6-(2-methylphenylthio)-VOPc
octa-3,6-(2-ethylphenylthio)-VOPc
octa-3,6-(4-i-propylphenylthio)-TiOPc
octa-3,6-(2-i-propylphenylthio)-VOPc
octa-3,6-(2,4-dimethylphenylthio)-VOPc
octa-3,6-(2,5-dimethylphenylthio)-VOPc
octa-3,6-(3,5-dimethylphenylthio)-VOPc
octa-3,6-(4-methoxyphenylthio)-VOPc
octa-3,6-(4-n-propoxyphenylthio)-MoOPc
octa-3,6-(4-methylthiophenylthio)-TiOPc
octa-3,6-(4-methylthiophenylthio)-VOPc
octa-3,6-(3,4-dimethylphenylthio)-VOPc
octa-3,6-(3-methoxycarbonylphenylthio)-MoOPc
octa-3,6-(3-hydroxycarbonylphenylthio)-VOPc
octa-3,6-(2-[hydroxycarbonylmethyl]phenylthio)-VOPc
octa-3,6-(3-[2-hydroxycarbonylethyl]phenylthio)-VOPc
octa-3,6-(4-[3-hydroxycarbonyl-n-propyl]phenylthio)-VOPc
octa-3,6-(4-hydroxysulphonylphenylthio)-VOPc
octa-3,6-(4-hydroxyphenylthio)-VOPc
octa-3,6-(naphtha-1-ylthio)-VOPc
octa-3,6-(naphtha-2-ylthio)-VOPc
octa-3,6-(2-chlorophenylthio)-VOPc
octa-3,6-(4-bromophenylthio)-TiOPc
octa-3,6-(3,5-dichlorophenylthio)-MoOPc
octa-3,6-(benzylthio)-VOPc
octa-3,6-(phenyltelluro)-VOPc
and octa-3,6-(butylthio)-MoOPc.

Examples of compounds of the present invention conforming to Formula I are:

hepta-3,6-(2,4-dimethylphenylthio)-mono-3,6-chloro-VOPc
hepta-3,6-(4-bromophenylthio)-mono-3,6-chloro-TiOPc
hexa-3,6-(4-methylphenylthio)-di-3,6-chloro-VOPc
hexa-3,6-(2,5-dimethylphenylthio)-di-3,6-chloro-MoOPc
and penta-3,6-(2-methoxyphenylthio)-tri-3,6-chloro-TiOPc.

Although the groups attached to the eight "3,6-carbon atoms" may be different, they are preferably identical and each is more preferably an optionally-substituted phenyl group of the Formula IV:

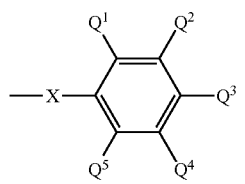

Formula IV wherein each of $Q^1$ to $Q^5$ is independently selected from H, $C_{1-3}$-alkyl, more especially methyl; $C_{1-3}$alkoxy more especially methoxy; $C_{1-3}$-alkylthio, more especially methylthio; $C_{1-3}$-alkylsulphonyl, $C_{1-3}$-alkylsulphonylamino, $C_{1-3}$-alkylsulphoxide, amino, mono- and di-$C_{1-3}$-alkylamino, halogen, nitro, cyano and hydroxycarbonyl, hydroxysulphonyl, dihydroxyphosphonyl, hydroxycarbonyl-$C_{1-3}$-alkyl, hydroxysulphonyl-$C_{1-3}$-alkyl or hydroxy-phosphonyl-$C_{1-3}$-alkyl or $C_{1-3}$-alkyl esters thereof. In the phenyl group of Formula IV, $Q^2$ and $Q^4$ are both preferably H. It is further preferred that $Q^1$, $Q^3$ and $Q^5$ are not electron-withdrawing groups, such as hydroxycarbonyl, nitro or cyano.

The present compounds in which the groups represented by J and/or L contain a hydroxycarbonyl, hydroxysulphonyl or hydroxyphosphonyl group (especially in the salt form), generally have increased hydrophilicity (and solubility in aqueous media) and reduced hydrophobicity (and solubility in organic media) compared with compounds which do not contain such a group. Hydrophilicity (and aqueous solubility) also may be effected and/or enhanced by sulphonation and/or phosphonylation of the present compounds whereby hydroxysulphonyl and/or dihydroxyphosphonyl groups may be introduced onto carbon atoms in the phthalocyanine nucleus itself or in the pendant phenyl or naphthyl groups attached thereto. This facility for enhancing hydrophilicity by sulphonation and/or phosphonylation is an important feature of the present compounds because it has been found that the introduction of such groups has a minimal effect on their other properties, especially the position of their absorption peak in the IR region of the spectrum. Thus a solvent soluble compound according to the present invention may be rendered more hydrophilic (and thus its aqueous solubility increased) merely by sulphonation without affecting its infra-red absorbing properties.

The present compounds may be prepared by the processes described in EP 0155780 A for the preparation of the analogous first preferred class of compounds described therein.

Compounds according to the present invention (and more especially those of Formula III) have a narrow main absorption peak (half-band width generally less than 60 nm) in the infra-red region of the electromagnetic spectrum and this peak is bathochromically displaced with respect to the compounds disclosed in EP 0155780 so that they have a fainter coloration and are thus less easily detectable by visual inspection when applied to a substrate. The present compounds are also generally more thermally stable and resistant to fading under the effects of illumination by electromagnetic irradiation than octa-3,6-(4-t-butylphenylthio)-VOPc.

The present compounds are particularly useful as infra-red absorbers (IRA) in the following applications:

(a) Heat Input Systems, wherein it is desired to input heat at specific locations by exposure to infra-red radiation, e.g. in electrophotography where laser-induced fixation of the latent toner image is enhanced by the presence of the IRA in the toner, in print plate manufacture where the presence of the IRA in the photosensitive layer on a lithographic print plate enhances the formation of the laser-induced image on the print plate, and in polymer welding wherein laser-induced heat generation in the vicinity of the weld is enhanced by the presence of the IRA;

(b) IR Radiation Protection Systems, wherein it is desired to absorb infra-red radiation from incident radiation in order to protect a subject from the effects of this radiation, e.g. in heat resistant ("solar") glazing for buildings or cars, in sun visors and in welding goggles; and (c) Detection/Handling Systems wherein it is desired to provide or enhance a machine-detectable IR or heat energy signal for use in medical treatment, e.g. in tracing the movement of a drug doped with the IRA, enhancing a thermal signal in thermal imaging, fault detection, e.g. detecting cracks flooded with a solution of the IRA, and automated detection and/or manipulation of articles marked with the IRA, e.g. in mail sorting or in machine reading of prices and related information in supermarket operations.

According to a second aspect of the present invention there is provided a method for the production of a lithographic printing plate containing a photosensitive layer comprising irradiating the photosensitive layer with an infrared laser in accordance with pattern information wherein the photosensitive layer comprises an IRA of formula I but without the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc.

According to a third aspect of the present invention there is provided a method of polymer welding in which a polymer material is irradiated with infra-red laser in a region where it is desired to form a weld wherein the polymer material comprises a compound of formula I without the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc or wherein the polymer material is coated or printed with the compound where it is desired to form a weld or wherein the compound is provided in a layer or film which is located adjacent the polymer material where it is desired to form a weld. The polymer material may comprise the compound by extruding the compound into the polymer material. The compound may be incorporated into the aforementioned film by extrusion or solution deposition.

According to a fourth aspect of the present invention there is provided a method for the protection of the interior of a glazed structure against the heating effect of incident IR radiation by incorporating into the glazing or a layer forming part of the glazing an IRA of formula I without the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc.

According to a fifth aspect of the present invention there is provided a method for the attenuation of IR irradiation passing through a protective transparent film (such as a visor or eyepiece of goggles) by incorporating into the protective film or a layer forming part of the protective film an IRA of formula I without the proviso that the compound is not tetra-3-(4-methylphenylthio)-tetra-6-(NH-cyclohexyl) VOPc, octa-3,6-(thiophenyl)VOPc, octa-3,6-(thiomethyl) TiOPc or octa-3,6-(thioethyl)VOPc.

According to a sixth aspect of the present invention there is provided a method for detecting an article carrying a superficial image by scanning with an infra-red detector wherein the image comprises an IRA of formula I without the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc.

According to a seventh aspect of the present invention there is provided a method for the formation of a permanent toner image on a substrate using an electrophotographic device incorporating an IR source, in order to fix the temporary toner image on the substrate and/or provide an IR-readable permanent toner image, wherein the toner comprises an IRA of formula I without the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc.

According to an eighth aspect of the present invention there is provided a method for enhancing a thermal signal, e.g. from a process or article, by incorporating into or onto the process medium or article from which the thermal signal is derived an IRA of formula I without the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc.

According to a ninth aspect of the present invention there is provided a method for the detection of passages through an IR permeable solid by applying to the solid a liquid containing an IRA of formula I without the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc to the solid and examining the solid for the presence of the IRA therein.

According to a tenth aspect of the present invention there is provided an article carrying an image adapted for machine reading in response to a reflective signal generated by scanning the image with infra-red radiation wherein the image comprises an IRA of formula I without the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc, especially for use in the automated recognition and handling and/or sorting of articles, such as mail and super-markets goods.

In the aforementioned applications where the IRA is applied to a surface, this may be effected by dissolving or dispersing it into a liquid medium so as to form an ink and applying the ink to the surface using an appropriate printing technique.

According to an eleventh aspect of the present invention there is provided an ink comprising an IRA of formula I without the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc in an ink medium.

A first preferred ink according to the eleventh aspect of the present invention also comprises a colorant. Such an ink in which the colorant and IRA are both dissolved in the ink medium is generally suitable for use in the ink jet printing of absorbent materials such as paper and card.

A second preferred ink according to the eleventh aspect of the present invention also comprises an alkoxylated or polyalkoxylated acrylate monomer, a photoinitiator and a colorant (as hereinafter further described).

The compounds of formula I but without the proviso that the compound is not tetra-3-(4-methylphenylthio)-tetra-6-(NH-cyclohexyl)VOPc, octa-3,6-(thiophenyl)VOPc, octa-3, 6-(thiomethyl)TiOPc or octa-3,6-(thioethyl)VOPc may be used for example in inks and toners for printing and electroreprographic use and in printing processes using such inks and toners on a range of substrates and articles, particularly for use in security marking or labelling. Such inks and toners may be used in security printing applications for counterfeit and fraud detection as herein after described. The method of printing is preferably selected from the following: offset lithographic, gravure, ink jet, intaglio, and letterpress. The compounds may also also be used in electrophotographic toners, matrix or daisy-wheel printer inks and in non-impact printing methods.

The invention also comprises in a further aspect the use of the compounds of formula I but without the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc as a security marker, preferably in a composition (such as an ink) which is applied by a variety of methods, e.g. printing methods, to articles or substrates. Examples of substrates are generally paper, including rag paper, preferably currency grade paper, plastics-coated or laminated paper, and plastics such as bankcard-grade PVC, or plastic paper, e.g. nonwoven plastic paper. Examples of articles include documents, packaging or goods bearing a printed mark such as banknotes, banknote thread, currency, travellers' cheques, bonds, certificates, stamps, lottery tickets, ownership documents, passports, identity cards, credit cards, charge cards, access cards, smart cards, brand authentication labels and tags, and tamperproof labels.

According to a still further aspect of the present invention, there is provided a method of establishing the authenticity of an article or substrate whereby the article or substrate is marked with a compound according formula I without the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc and a characteristic absorption of infrared radiation by the mark is detected and/or measured, e.g. by standard spectroscopic methods.

The compounds of formula I but without the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc may be used where it is desired to provide a machine-detectable IR identification or actuation signal, e.g. in security marking of valuable articles, such as documents, currency, jewellery and bonded materials, such as fuels and alcoholic drinks; and for computer controlled locks and alarms.

(a) Heat Input Systems (i) Conventional Toner

A suitable flash fixing toner comprises a binder resin, a coloring agent and an IRA according to the present invention but without the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc, in which the IRA is preferably present in an amount from about 0.01% to 5.0% (more preferably 0.1-3.0%) by weight, based on the total amount of the toner. The IRA is conveniently dispersed (or dissolved) in the binder resin forming the matrix of the toner particles.

The binder resin may be any suitable resin used in flash fixing toners, such as polystyrenes; co-polymers of styrene with (meth)acrylic esters, acrylonitrile, or maleic esters; poly(meth)acrylic esters; polyesters; polyamides; epoxy resins; phenolic resins; hydrocarbon resins; and petroleum resins, which may be used alone or in combination with each other or with other resins or additives. Preferred resins are polyester resins and epoxy resins of Bisphenol A and epichlorohydrin.

The colorant may be any of those suitable for use in flash fixing toners, for example one or more pigments or dyes, such as, chrome yellow, cadmium yellow, yellow iron oxide, titan yellow, naphthol yellow, Hanza yellow, pigment yellow, benzidine yellow, permanent yellow, quinoline yellow, anthrapyrimidine yellow, permanent orange, molybdenum orange, vulcan fast orange, benzidine orange, indanthrene brilliant orange, iron oxide, amber, permanent brown, rose iron oxide red, antimony powder, permanent red, fire red, brilliant carmine, light fast red toner, permanent carmine, pyrazolone red, Bordeaux, helio-Bordeaux, rhodamine lake, DuPont oil red, thioindigo red, thioindigo maron, watching red strontium, cobalt purple, fast violet, dioxane violet, methyl violet lake, methylene blue, aniline blue, cobalt blue, cerulean blue, chalco oil blue, nonmetal phthalocyanine blue, phthalocyanine blue, ultramarine blue, indanthrene blue, indigo, chrome green, cobalt green, pigment green B, green gold, phthalocyanine green, malachite green oxalate and polychromo-bromo copper phthalocyanine. The amount of colorant agent may be varied widely but is preferably present in an amount from 3 to 15 parts by weight, based on 100 parts by weight of the binder resin The flash fixing toner may incorporate further components, such as a wax, a charge control agent and/or a flow-enhancer.

The wax may be a polyolefin type or natural wax, such as carnauba wax, montan wax, and a natural paraffin, polyethylene, polypropylene, polybutylene, ethylene-propylene copolymer, ethylene-butene copolymer, ethylene-pentene copolymer, ethylene-3-methyl-1-butene copolymer, and copolymers of olefins with other monomers, such as vinyl esters, halo-olefins, (meth)acrylic esters, and (meth) acrylic acid or derivatives. The weight-average molecular weight of the waxy component is preferably from 1,000 to 45,000 daltons.

Examples of suitable charge control agents are nigrosine, monoazo dyes, zinc, hexadecyl succinate, alkyl esters or alkyl amides of naphthoic acid, nitrohumic acid, N,N-tetramethyl diamine benzophenone, N,N-tetramethyl benzidine, triazines and metal complexes of salicylic acid. If the colorant is other than black, it is preferred that the charge control agent is substantially colourless.

Example of suitable flow-enhancing agents are minute particles of inorganic substances, such as colloidal silica, hydrophobic silica, hydrophobic titania, hydrophobic zirconia, and talc and minute particles of organic substances, such as polystyrene beads and (meth)acrylic resin beads.

If the IRA is soluble or dispersible in the relevant binder resin, the coloring agent and IRA (and any other components mentioned above) are preferably compounded and kneaded together. After cooling and pulverizing the resultant mixture, the particles are classified.

(ii) Chemically Produced Toner

An IRA according to the present invention but without the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc may be incorporated into a chemically produced toner. The toner may comprise one or more polymers, mixtures of polymers being appropriate where polymers of different molecular weight are used to control the molecular weight distribution and the melt rheology properties of the toner. Examples of suitable polymers are styrene-acrylate copolymers, styrene-butadiene copolymers, polyesters and hydrocarbon resins. The toner may incorporate colorant to provide a coloured image on the printed substrate, charge control agent to enhance uptake of electrical charge and wax to aid release from the fusion roller. Suitable colorants are pigments (including magnetic pigments, provided these do not interfere with the absorption of infra-red radiation by the IRA) and dyes. Suitable charge control agents include metal complexes, such as complexes of Zn, Al, Fe or Cr, and polymeric materials, such as phenolic polymers. Suitable waxes include hydrocarbon waxes, such as paraffin, polyethylene or polypropylene waxes, waxes derived from carbon monoxide and hydrogen, such as Fischer-Tropsch waxes, natural product waxes, such as carnauba wax, and synthetic waxes, such as ester or amide waxes. The toner may also contain surface additives, such as silica, titania, alumina or polymeric particles, to control flow, charging performance or transfer properties.

(iii) Offset Printing Plate Production

Offset printing plates are generally prepared from a recording material comprising a substrate and a photosensitive image layer formed on the front of said substrate, permitting a desired pattern to be formed on the image layer by irradiation with a suitable source of electromagnetic radiation. One known recording material contains an IRA incorporated in the image layer and the desired pattern is formed by irradiation with IR radiation, generally from a laser, in accordance with prescribed pattern information. The present IRA but without the proviso that the compound is not tetra-3-(4-methylphenylthio)-tetra-6-(NH-cyclohexyl) VOPc, octa-3,6-(thiophenyl)VOPc, octa-3,6-(thiomethyl) TiOPc or octa-3,6-(thioethyl)VOPc is suitable for use in such a recording material especially for use in conjunction with an IR laser with an emission peak in the region of 750 nm to 1000 nm, such as the commercially available solid-state laser diode with a main emission peak at about 830 nm. Suitable recording materials for offset printing plates in which the present IRA can be incorporated into the photosensitive layer are described, for example, in U.S. Pat. No. 6,294,298 and the publications disclosed therein, though these are not limiting on the invention.

(iv) Laser Welding

An example of laser welding is given in GB-A-2,276,584 which provides a method for welding together two bodies of thermoplastic material (one of which is substantially transparent to infra-red radiation and the other substantially opaque to the radaition) held with two adjacent surfaces in contact (defining a contact region between the two bodies) by irradiating the surface of the opaque body in the contact region with infra-red radiation through the transparent body whereby the surfaces of both bodies in the contact region may be heated to a temperature at which they fuse and become joined together by a fusion weld, through absorption of ir radiation by the opaque body in the contact region and transmission of heat thereby generated to the ir-transparent body in the contact region. The infra-red opacity of the opaque thermoplastic body may be enhanced by the addition of an IRA according to the first aspect of the present invention but without the proviso that the compound is not tetra-3-(4-methylphenylthio)-tetra-6-(NH-cyclohexyl) VOPc, octa-3,6-(thiophenyl)VOPc, octa-3,6-(thiomethyl) TiOPc or octa-3,6-(thioethyl)VOPc.

Using this method, thermoplastic pipe can be radially reinforced by winding one or more layers of fibre reinforced thermoplastic tape or film around the pipe. The tapes are conveniently wound on the pipe in pairs, in which the tapes are of opposite hand to balance the torsional forces when the pipe is conveying a product under pressure. Each tape is wound under tension which serves to hold the tape and pipe in close contact in order to ensure that a fusion weld is formed between them during the subsequent welding stage. The first tape in the pair is applied directly to the pipe and the second tape applied on top of the first tape under sufficient tension to hold both tapes firmly against the pipe so that they become fused thereto in the welding stage. Further tapes, singly or in pairs, can be wound on top of the first pairs to provide additional reinforcement. Typically each tape is composed of polyethylene and contains a number of reinforcing fibres extending lengthwise of the tape and evenly distributed across its width. Each fibre is conveniently composed of a bundle of fine filaments of a suitable reinforcing material, such as aramid. Alternatively, a pipe may be longitudinally reinforced by applying the reinforcing tape along the length of the pipe so that the strength of the tape is parallel to the longitudinal axis of the tape. In both these examples, the tape constitutes the substantially IR-transparent body, the pipe constitutes the IR-opaque body and the fusion weld is formed by irradiating the pipe with IR radiation from the outside, through the reinforcing tapes, in order to effect fusion of the layers of thermoplastic material adjacent to the contact layer between the inner surfaces of the tapes and the outer surface of the pipe.

The IRA may be used as a radiation absorbing additive in other IR laser welding techniques which are known.

(b) IR Radiation Protection Systems (i) Heat Resistant Glazing

An IRA according to the present invention but without the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc may be used as the wavelength gap-filling component (WGFC) of an optical body, for example of the type described in U.S. Pat. No. 6,049,419 (the contents of which are incorporated herein) comprising either:

1 (a) a birefringent dielectric multilayer film, which may be a polarizer, mirror, or both, having a reflecting band positioned to reflect infrared radiation of at least one polarization at an incident angle normal to the film, said reflecting band having a short wavelength bandedge $\lambda_a 0$ and long wavelength bandedge $\lambda_b 0$ at a normal incident angle, and a short wavelength bandedge $\lambda_a \theta$ and long wavelength bandedge $\lambda_b \theta$. at a maximum usage angle $\theta$, wherein $\lambda_a \theta$ is less than $\lambda_a 0$ and $\lambda_a 0$ is selectively positioned at a wavelength greater than about 700 nm; and (b) a component which at least partially absorbs or reflects radiation in the wavelength region between $\lambda_a \theta$ and $\lambda_a 0$ at a normal angle of incidence (WGFC); or 2. (a) an isotropic dielectric multilayer film having a reflecting band positioned to reflect infrared radiation of at least one polarization at an incident angle normal to the film, said reflecting band having a short wavelength bandedge $\lambda_a 0$ and long wavelength bandedge $\lambda_b 0$ at a normal incident angle, and a short wavelength bandedge $\lambda_a \theta$ and long wavelength bandedge $\lambda_b \theta$ at a maximum usage angle $\theta$, wherein $\lambda_a \theta$ is less than $\lambda_a 0$ and $\lambda_a 0$ is selectively positioned at a wavelength greater than about 700 nm; and (b) a component which at least partially absorbs or reflects radiation in the wavelength region between $\lambda_a \theta$ and $\lambda_a 0$ at a normal angle of incidence (WGFC).

This optical body provides good reflectivity in the infrared region of the spectrum and improved shading coefficient at normal angles while still transmitting visible light at all desirable angles of incidence.

The WGFC functions to either absorb or reflect the infrared wavelengths that are not reflected by the film at normal angles because of the need to shift the reflective band of the film to higher wavelengths in order to minimize perceived colour changes at non-normal incidence. Depending on the placement of the WGFC relative to the film, it may not function at non-normal angles because the reflective band shifts to lower wavelengths, preferably coinciding with the wavelength region of the absorption or reflection of the WGFC. The WGFC may be incorporated into one or more of the film layers or incorporated into a separate or discrete part of the optical body, i.e. a separate layer from the film (a) that may be attached thereto by lamination. In this type, the WGFC (i.e. IRA) is incorporated into a separate layer adhered to the film (a). The WGFC may be a part of the film or separate from the film, depending on the characteristics of the film with which it is being combined.

The film (a) and the WGFC (b) may be combined so that the film is placed on a surface nearest the sun as practical because it is more efficient to reflect solar energy than to absorb it. Where possible, it is preferable that the sun's rays first encounter the film and then secondarily encounter the WGFC. In a multiple pane or two-ply windshield, the most preferable placement for the film is the exterior nearest the sun, the next preferably position is between the panes or plies. The film may be placed on the interior surface but this allows absorption of solar light by the glass before the light reaches the film and absorption of part of the light reflected from the film. This arrangement may be preferable when considered from a UV protection standpoint, since it may be preferable to position the film away from the sun, allowing components that are less sensitive to UV to absorb this part of the light.

The WGFC (IRA) can be applied to either surface of the film (a), in a layer of glass or polymer, such as polycarbonate or acrylic, laminated to the film, or be present in at least one of the polymer layers of the film. From a solar energy standpoint, the WGFC is preferably on the innermost surface of the film (i.e. toward the interior and away from the sun) so that when the sun is a high angle, the film reflective band shifts to lower wavelengths, essentially coinciding with the $\lambda_{max}$ region of the dye. This is preferred because reflecting solar energy away from the film is preferred to absorbing it. The amount of WGFC used in the optical body of the present invention may be varied depending on the specific nature of IRA and the end use application. Typically, when applied to the surface of the film, IRA is present on the surface at a concentration and coating thickness suitable to accomplish the desired infrared absorption and visible appearance. Typically, if the IRA is within an additional layer or within the multilayer optical body, the concentration ranges from about 0.05% to about 0.5% by weight, based on the total weight of the optical body. It is highly desirable that the IRA is finely divided to such an extent that the particle size is less that the wavelength of the incident light. If the IRA is non-polar solvent soluble and is heat stable, it can be coated or mixed in with solid plastic pellets and extruded.

However, the present IRA is not limited to use only in an optical body of this type, but may be used in any other optical body with a like purpose, i.e. attenuation of IR radiation.

(c) Detection/Handling Systems

Such systems conveniently comprise a detector to detect, and optionally to measure the strength of, an infra-red signal from an image on an article to be detected or a thermal signal (enhanced by the presence of an IRA in the image) and may feed this to an automated handling system for manipulation of the article in accordance with information in the signal or to a data handling system for stock recording or accounting.

The image may be formed by application of an ink to the article, especially a UV curable ink containing an IRA according to the present invention but without the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc.

(i) UV Curable Ink

A suitable UV-curable ink comprises an alkoxylated or polyalkoxylated acrylate monomer, a photoinitiator and a colorant, such as that described in U.S. Pat. No. 6,114,406 (the contents of which are incorporated herein by reference).

A preferred UV-curable ink jet composition comprises, 80% to 95% by weight of a polyfunctional alkoxylated and/or polyalkoxylated acrylate monomer material with respect to the total composition, a photoinitiator, an IRA and, optionally, a colorant.

The amounts of the acrylate monomer, photoinitiator, IRA and colorant may be varied according to the particular equipment and application. However, the amount of photoinitiator is preferably from 1% to 15% by weight of the total composition.

The polyfunctional alkoxylated or polyalkoxylated acrylate monomer material may comprise one or more di- or tri-acrylates or alkoxylated or polyalkoxylated acrylic monomers of higher functionality may be used alone or together with one or more di-and/or trifunctional materials. The number of alkyleneoxy groups is preferably from 1 to 20 per molecule of the monomer and each such group is preferably $C_{2-4}$-alkyleneoxy, more especially ethyleneoxy (EO) or propyleneoxy (PO).

Suitable polyfunctional alkoxylated or polyalkoxylated acrylates are alkoxylated, preferably ethoxylated or propoxylated, adducts of neopentylglycol diacrylates, butanediol diacrylates, trimethylpropane tri-acrylates and glyceryl triacrylate.

The ink may also contain up to 10%, by weight of a monofunctional alkoxylated or polyalkoxylated acrylate monomer, such as an alkoxylated, especially ethoxylated or propoxylated, adduct of one or more of tetrahydrofurfuryl acrylates, cyclohexyl acrylates, alkyl acrylates, nonyl-phenol acrylate and polyethylene- or polypropylene-glycol acrylates.

The ink may also contain up to 5%, by weight of a non-alkoxylated mono or poly-functional radiation curable monomer, such as octyl acrylate, decyl acrylate, N-vinyl-pyrollidone, ethyldiglycol acrylate, isobornyl acrylate, ethyl-hexyl acrylate, lauryl acrylate, butanediol monoacrylate, β-carboxyethyl acrylate, i-butyl acrylate, polypropyleneglycol monomethacrylate, 2-hydroxyethyl methacrylate, hexanediol di(meth)acrylate, tetraethyleneglycol diacrylate, tripropyleneglycol diacrylate, butanediol diacrylate, polyethyleneglycol diacrylates and triethyleneglycol dimethacrylate.

Examples of suitable commercially available photoinitiators are xanthones, thioxanthones, benzophenones, quinones and phosphine oxides. Examples of co-initiators that may be included with the primary photoinitiator include amines and aminobenzoates. Where the ink includes a primary and a co-initiator, the total amount is preferable within the aforementioned preferred range Aminobenzoate and acrylated amine co-initiators are preferably used with the xanthone and/or thioxanthone primary photoinitiator.

By the term radiation curable is meant that the composition is curable by the application of UV radiation. Such a composition may be a substantially colourless curable varnish or base or may, if it contains a colorant (i.e. a material which provides visual colour or a related optical property, such as fluorescence), be an ink. Where a colorant is present, the ink preferably contains from 1% to 10% by weight of colorant with respect to the ink.

Suitable colorants fall into two classes, (a) dyes, which are substantially soluble in the ink composition and (b) pigments, which are dispersed in the ink composition in the form of fine particles, usually with the aid of a suitable dispersant. Typical pigments include Pigment Red 57:1, Pigment Red 52:2, Pigment Red 48:2, Pigment Blue 15:3, Pigment Green 7, Pigment Yellow 83, Pigment Yellow 13 and Pigment White 6. If the colorant is or contains carbon black no added IRA is generally required because carbon black absorbs strongly in the IR region of the spectrum.

The ink may also contain other minor ingredients, such as, surfactants, levelling additives, photoinitiator stabilisers, wetting agents and pigment stabilisers. The latter may for example be of polyester, polyurethane or polyacrylate types, especially in the form of high molecular weight block co-polymers, and are typically incorporated at a level from 2.5% to 100% by weight of the pigment. Specific examples are Disperbyk 161 or 162 (BYK Chemie) and Solsperse hyperdispersants (Avecia). Suitable photoinitiator stabilisers include those disclosed in EP-A-0 465 039. Suitable surfactants are preferably non-ionic, such as Fluorad FC430 (ex 3M Corp.). Such surfactants (when present) are preferably included in an amount of 0.1% to 10% by weight of the total composition.

The ink or varnish is preferably substantially or totally free of organic solvent. Thus, it preferably contains less than 10%, more preferably less than 5%, especially less than 1% and more especially less than 0.1% of organic solvent by weight of the total composition.

The present IRA is not limited to use only in a UV curable ink this type, but may be used in any other UV curable ink in which it is soluble or dispersible.

(ii) Image Enhancement Systems

In such systems an IRA is added to a medium in order to enhance the strength of a thermal signal. One method for creating and detecting a thermal energy difference between a material and its surroundings comprises the steps of (i) adding an IRA according to the first aspect of the present invention but without the proviso that the compound is not tetra-3-(4-methylphenylthio)-tetra-6-(NH-cyclohexyl) VOPc, octa-3,6-(thiophenyl)VOPc, octa-3,6-(thiomethyl) TiOPc or octa-3,6-(thioethyl)VOPc to the material and/or to its surroundings, (ii) exposing the material and/or its surroundings to an input energy to create a thermal image; and (iii) measuring a change in the temperature of the material and/or its surroundings by means of a thermal image detector. The IRA is preferably added only to the material or only to the surroundings of the material in order to enhance the contrast between them.

The IRA may be used in solid form, in solution or in dispersion, or in vaporised or atomised to form an aerosol, and directed substantially to the target site or sites for imaging. Such direction may occur by a natural affinity of the IRA for the particular target site, or may be achieved by a targeted imaging process where a carrier is used, which may comprise vectors such as antibodies or other similar systems or the IRA may be directly placed in the target area. Alternatively direction may occur by restricting the mobility of the IRA so that it remains substantially in the target area, for example by controlling the inherent solubility, pH or lipid/water partition of the IRA.

The material may comprise any part of: a human or animal body, a plant or other vegetation, a building or engineering construction, a motor vehicle and applications in aviation transport or substrates such as paper, including rag paper, printer quality paper, currency grade paper, plastics-coated or laminated paper or other substrates typically used for documents or packaging.

The input energy is preferably a radiation source of preferably electronic energy of wavelength between 800 nm and 1000 nm. Typical irradiation sources include a simple halogen bulb, having an emission spectrum with a substantial portion in the near infra-red region, a Light Emitting Diode (LED) and a IR semiconductor laser, such the GaAlAs laser (emission at 785 nm). Illumination times may be selected appropriately to give optimum imaging without significant direct heating which might interfere with the strength of the signal.

The thermal image detector may be any device able to detect and preferably record a thermal energy difference between or within a material and/or its surroundings, such as a thermal imaging camera (e.g. ThermaCAM® SC1000 camera, available from FLIR Systems, Boston, USA). The thermal imaging camera preferably comprises a charge couple device (CCD) sensitive to light of wavelength between 1.5 and 15 microns, more preferably between 3.4 and 5 microns. Image manipulation and data handling are achieved using appropriate computer software such as Thermagram® PRO95 software available from Thermoteknix Systems Limited, Cambridge, UK.

The IRA is conveniently added to the material and/or its surroundings in the form of a composition comprising the IRA and a liquid medium. The IRA may be dissolved or dispersed in the liquid medium. Suitable liquid media include water, a mixture of water and an organic solvent and an organic solvent free from water. It is preferred that the organic solvent present in the mixture of water and organic solvent is a water-miscible organic solvent or mixture of such solvents. Preferred water-miscible organic solvents include alcohols, more especially methanol, ethanol; dimethylsulfoxide; cyclic amides, especially 2-pyrrolidone, N-methyl-pyrrolidone and N-ethyl-pyrrolidone; diols, especially 1,5-pentane-diol, ethyleneglycol, thiodiglycol, diethyleneglycol and triethyleneglycol; and mono-$C_{1-4}$-alkyl and $C_{1-4}$-alkyl-ethers of diols, more preferably mono-$C_{1-4}$-alkyl ethers of diols having 2 to 12 carbon atoms, especially 2-methoxy-2-ethoxy-2-ethoxyethanol.

(d) Security Systems (i) Lithographic Printing Ink

An ink vehicle for a lithographic printing ink may be derived from a cross-linked resin prepared by grafting a polyepoxide onto carboxyl groups available on, for example, a phenolic- or maleic-modified rosin ester resin and solubilized with an aliphatic alcohol having at least 12 carbon atoms.

The phenolic- or maleic-modified rosin ester resin preferably has a number average molecular weight from about 1,500 to 3,000. The polyepoxide is preferably a diepoxide, more preferably an aromatatic or cycloaliphatic diepoxide, and especially bisphenol A diepoxide. The molecular weight of the polyepoxide is preferably up to 560 daltons, more preferably from 100 to 500 daltons, and especially from 300 to 500 daltons.

The phenolic- or maleic-modified rosin resin is preferably the reaction product of four components, which are (a) a polyol, (b) a monobasic aliphatic carboxylic acid, (c) a rosin or modified rosin, and (d) a polycarboxylic acid and/or anhydride thereof. The polyol is preferably a triol and examples are trimethylolethane, trimethylolpropane, glycerol and hexanetriol. A preferred monobasic aliphatic carboxylic acid has about 8 to 20 carbon atoms, such as stearic acid, lauric acid, palmitic acid, oleic acid and refined tall oil fatty acid. A preferred rosin or modified rosin is selected from tall oil rosin, wood rosin, hydrogenated rosin and dehydrogenated rosin. The polycarboxylic acid or anhydride may be aliphatic or aromatic and examples include phthalic anhydride, trimellitic anhydride, tetrahydrophthalic anhydride, maleic anhydride, isophthalic acid, fumaric acid, and mixtures thereof.

The phenolic- or maleic-modified rosin resin may be prepared by a two-step process whereby in the first step, the polyol, the monobasic aliphatic carboxylic acid, and the rosin or modified rosin are reacted at a temperature from about 250° to 290° C. and preferably from about 260° to 280° C. to an acid number from about 1 to 10. In the second step, the polycarboxylic acid or anhydride is added and the reaction is continued at a temperature from about 150° to 220° C., preferably from about 170° to 200° C. to an acid number from about 20 to 90, and preferably from about 20 and 50. As a result, all of the monobasic aliphatic carboxylic acid groups and most of the rosin carboxylic acid groups are reacted at about 250° to 290° C. and the aromatic carboxylic groups as pendant groups are added at about 150° to 220° C.

Grafting of the polyepoxide onto the ink resin leaves the resulting polymer oil insoluble which enhances squalene (skin oil) resistance, facilitates solvent release for improved heatset drying. Since the cross-linked resin is only sparingly soluble, it is kept in solution by the presence of an aliphatic alcohol having at least 12 carbon atoms, preferably 12 to 24 carbon atoms, and more preferably 12 to 13 carbons, such as Neodol 23 (Shell Oil Co.).

In order to achieve ink roller stability required for high speed, lithographic web printing, the also contains a high boiling petroleum distillate varnish solvent, such as Magie 470 & Magie 500 (hydrocarbon solvents available from Magie Brothers Oil Company, 9101 Fullerton Ave., Franklin Park, Ill.). The aliphatic alcohol is used to solubilize the resin in the solvent. When the balance of solubility is affected by some of the alcohol being evaporated off during the heat drying process and adsorption into the paper, the resin precipitates out of solution and renders an ink film that is dry to the touch. The more alcohol that evaporates off, the dryer the ink becomes. The proper amount of alcohol is that amount that would enable the ink to transfer through the printing rollers of the press and print the paper without drying during the printing process.

An IRA according to the invention without the proviso that the compound is not tetra-3-(4-methylphenylthio)-tetra-6-(NH-cyclohexyl)VOPc, octa-3,6-(thiophenyl)VOPc, octa-3,6-(thiomethyl)TiOPc or octa-3,6-(thioethyl)VOPc incorporated into this ink vehicle in an amount from about 0.01% to 5.0%, preferably from about 0.1% to 3.0%, by weight based on the total weight of the ink, will provide a infra-red absorbing ink that is detectable, after application to a substrate, only when the substrate is viewed under appropriate illumination by an infra-red sensitive detector.

If the ink also contains a colorant, the printed pattern may be detectable visually, but the printed substrate is distinguishable, from a substrate printed with an ink not containing the IRA, in a similar manner. The colorant may be any of a variety of conventional organic or inorganic pigments, e.g., molybdate orange, titanium white, phthalocyanine blue, and carbon black. The amount of colorant is conveniently from about 5 to 30 wt. % based on the total weight of the ink.

Modifiers, such as plasticizers; wetting agents for the colorant; levelling agents, e.g. lanolin, paraffin waxes, and natural waxes; slip agents, e.g. low molecular weight polyethylenes and microcrystalline petroleum waxes may also be incorporated into the ink. Such modifiers are generally used in amounts ranging up to about 3%, preferably up to about 1% by weight, based on the total weight of the ink. Other ingredients conventionally used in inks and coatings to modify adhesion, toughness, and other key properties may also be used.

The lithographic printing ink may be prepared in any convenient manner, such as for example in a three-roll mill, by a mix and filter process, or the like, in accordance with known dispersion techniques. The ink may be applied to the substrate, preferably paper, in any known and convenient manner.

(ii) Solvent Based Ink-Jet Printing (IJP) Ink

An ink vehicle for a organic solvent-based ink-jet printing ink may conveniently comprise at least one aromatic sulfonamide or hydroxybenzoic acid ester dissolved in an organic solvent.

The aromatic sulphonamide is preferably an optionally substituted toluenesulphonamide, such as p-toluenesulfonamide, N-ethyl-p-toluenesulfonamide, N-butyl-p-toluenesulfonamide and N-cyclohexyl-p-toluenesulfonamide. The aromatic sulfonamide is preferably incorporated in the organic solvent-based ijp ink in an amount from 0.1% to 40% by weight.

The hydroxybenzoic acid ester is preferably an alkyl ester especially one containing from 6 to 12 carbon atoms, such as 2-ethylhexyl p-hydroxybenzoate and n-nonyl p-hydroxybenzoate. The hydroxybenzoic acid ester is preferably incorporated in the organic solvent-based ijp ink in an amount from 0.1% to 40% by weight.

The aromatic sulfonamide and hydroxybenzoic acid ester have such high polarity that they inhibit dye crystallization in a very effective manner.

A solvent soluble IRA incorporated into this ink in an amount from about 0.01% to 5.0%, preferably from about 0.1% to 3.0%, by weight based on the total weight of the ink, will provide a infra-red absorbing ink that is detectable, after application to a substrate, only when the substrate is viewed under appropriate illumination by an infra-red sensitive detector.

If the ink also contains a colorant, the printed pattern may be detectable visually, but the printed substrate may also be distinguished from a substrate printed with an ink not containing the IRA in a similar manner. The colorant may be any dye that is soluble in organic solvents or the aforementioned aromatic sulfonamides or hydroxybenzoic acid esters incorporated in this ink vehicle. Typically useful dyes, include azo dyes, metal complex salt dyes, naphthol dyes, anthraquinone dyes, indigo dyes, carbonium dyes, quinoimine dyes, cyanine dyes, quinoline dyes, nitro dyes, nitroso dyes, benzoquinone dyes, naphthoquinone dyes, naphthalimide dyes, perinone dyes, and phthalocyanine dyes. These dyes may be used either independently or in combination. The dyes are preferably incorporated in the ink vehicle in an amount from 0.1% to 10% by weight and preferably from 0.5% to 5%, by weight based on the total weight of the ink.

The type of organic solvent used in the ijp ink invention depends, to some extent, on the specific dye or dye mixture. However, as most dyes are polar, highly polar solvents will act as good solvents and less polar solvents act as poor solvents Therefore, highly polar solvents that have a high ability to dissolve dyes are preferred for preparing the ijp ink. However, less polar solvents can be used if they are mixed with an aromatic sulfonamide or hydroxybenzoic acid ester or combined with a more highly polar solvent. Specific examples of the organic solvents that can be used for the ijp inks include: aliphatic hydrocarbons; naphthenic hydrocarbons; aromatic hydrocarbons such as mono- or di-substituted alkylnaphthalenes, alkyl derivatives of biphenyls, xylylethane and phenethylcumene; glycols; mono- or di-alkyl ethers of glycols and esters of glycols; aliphatic acids and esters thereof; nitrogenous compounds such as amide and pyrrolidone compounds. It should, however, be noted that these are not the sole examples of the organic solvents that can be used for preparing the ijp inks.

The higher their boiling points, the more advantageous the solvents are from the viewpoint of reduced evaporation and drying speed. However, solvents having higher boiling temperatures have a tendency to produce viscous inks that are difficult to eject in a smooth way. On the other hand, solvents having lower boiling points produce inks that will dry too quickly at the nozzle orifice. Therefore, a suitable solvent having the desired viscosity and boiling point should be selected in consideration of the measure adopted by the print head to prevent ink drying.

(iii) Gravure/Intaglio Printing Ink

A suitable gravure ink for intaglio printing comprises a finely divided pigment dispersed in an ink vehicle composed of a resin and volatile solvent and preferably also an antioxidant or antioxidant composition.

The selection of resins for rotogravure inks depends on the solvent and the substrate to be printed and the end use of the printed matter. Detailed examples of resins suitable for the manufacture of inks, including gravure types, are set forth in "Synthetic Resins" by Werner Husen, The American Ink Maker, June 1952, page 63 and "Synthetic Resins for Inks," John P. Petrone, The American Ink Maker, Vol. 49, March-October, 1971, both of which are incorporated herein by reference. Useful resins include rosin and modified rosins, such as calcium and zinc resinates and variants of these. Other suitable resins include (a) petroleum resins or various modified products of cyclopentadiene resins, examples of which are found in U.S. Pat. No. 3,084,147 and British Patent No. 1,369,370, the disclosures of which are incorporated herein by reference and (b) a modified resin having a softening point of 145° C. having a stable viscosity and the capacity to induce excellent printing, as described in Japanese Patent No 47994/72 (this modified resin is prepared by collecting a fraction boiling at 140° to 220° C. from a cracking oil which is obtained by thermal cracking of petroleum, polymerizing the fraction using a Friedel-Craft catalyst to give a resin having a softening point of 160° C., reacting the resin with an unsaturated carboxylic acid or its anhydride in an amount of 0.01 to 0.4 mole per 100 gram of the resin, and esterifying the resulting resin using a monovalent alcohol in the amount of 0.2 to 2.0 moles per mole of the above unsaturated carboxylic acid or anhydride).

The volatile solvent constituent may be an aliphatic or an alicyclic hydrocarbon, such as hexane, heptane and cyclohexane or an aromatic hydrocarbon, such as xylene, toluene (e.g., tolusol 25), high flash naphtha, benzene and chlorobenzene. Other solvents include $C_{1-4}$-alkanols, the acetates of $C_{1-5}$-alkanols, glycol ethers having BP from 115° C. to 180° C., $C_{1-5}$-aliphatic ketones and cyclohexanone. The resin should be soluble in the solvent and readily separated therefrom. Since the drying of gravure inks results from evaporation of the solvent, the ink vehicle is esentially a resin and solvent. Depending upon the particular combination of resin and solvent various types of vehicles can be used.

A preferred antioxidant is a phenolic or an amine antioxidant and a preferred antioxidant composition is a mixture of phenolic and amine antioxidants. A preferred antioxidant composition contains about 10% to 90% by weight, more preferably about 25% to 75% by weight, of the phenolic antioxidant and about 90% to 10% by weight, more preferably about 75% to 25% by weight, of the amine antioxidant.

Suitable amine antioxidants include octylated diphenylamine, isopropoxy diphenylamine, aldol-α-naphthylamine condensation product of diphenylamine and acetone, N,N'-diphenyl-p-phenylenediamine, phenyl-β-naphthylamine, polymerized 1,2-dihydro-2,2,4-trimethylquinoline, N,N'-di (2-octyl)-p-phenylenediamine, other aromatic amines, diphenylamines, and mixtures thereof. Suitable phenolic antioxidants include 4,4'-isopropylidene-diphenol, styrenated phenol, hindered phenol, 4,4'-thiobis (6-t-butyl-o-cresol), p-butylphenol, p-(i-propyl)phenol, 2,4-dimethyl-6-octylphenol, 2,6-di-t-butyl-4-methylphenol, 2,6-di-t-butyl-4-ethylphenol, 2,6-di-t-butyl-4-n-butylphenol, 2,2'-methylenebis-(4-methyl-6-t-butylphenol), 2,2'-methylenebis(4-ethyl-6-t-butyl-phenol), 2,4-dimethyl-6-t-butylphenol, 4-hydroxymethyl-2,6-di-t-butylphenol, n-octadecyl-beta (3,5-di-t-butyl-4-hydroxyphenyl) propionate, mixtures thereof and the like. Preferred phenolic antioxidants are sterically hindered phenols.

The intaglio printing inks, including the antioxidant or antioxidant composition, may be prepared in a customary manner. For example, 100 parts by weight of the resin and 1 part by weight of antioxidant or antioxidant composition are dissolved in up to 200 parts by weight of a high boiling petroleum solvent, to prepare the ink vehicle. A preferred solvent, such as a mixture of 70% by weight toluene, 4% by weight xylene and 26% by weight lactol spirits, has a Kauri butanol value of about 105 (in contrast to with aliphatic solvents with a Kauri butanol value of 35-45).

An IRA incorporated into this ink vehicle, preferably as a dispersion, in an amount from about 0.01% to 5.0%, preferably from about 0.1% to 3.0%, by weight based on the total weight of the ink, will provide a transparent infra-red absorbing ink that is detectable, after application to a substrate, only when the substrate is viewed under appropriate illumination by an infra-red sensitive detector.

If the ink also contains a pigmentary colorant, the printed pattern may be detectable visually, but the printed substrate may also be distinguished from a substrate printed with an ink not containing the IRA in a similar manner.

The IRA or pigmentary colorant (such as Phthalocyanine Blue, Benzidine Yellow, channel black, Carmine 6B or titanium white) is added to the ink vehicle, preferably as a dispersion, and the mixture is placed in a ball mill and ground until a uniform dispersion is obtained of the pigment in the ink vehicle. The resulting ink concentrate may be subsequently diluted with additional solvent, to a concentration appropriate for use in the printing operation.

A typical gravure ink composition for intaglio printing contains about 0.005% to 0.5% by weight of the antioxidant composition, about 10% to 50% by weight of the resin and from about 0.01% to 5.0%, preferably, 0.1-3.0%, by weight of IRA based on the total weight of the ink and/or from about 50 to 100 parts of pigmentary colorant per 100 parts of resin, the balance consisting essentially of a mixture of hydrocarbon solvents such as toluene, xylene and lactol spirits. The viscosity of the ink at the point of use is preferably not more than 5 poise and more preferably from 0.5 to 1.0 poise. The amount of antioxidant composition used preferably ranges from 0.005 to 0.5% by weight and more preferably from 0.025 to 0.5% by weight percent based on total weight of the ink.

Other additives can be incorporated into the printing ink to improve printability, flow behaviour and pigment wetting, preferably in amounts from 1% to 15% (more preferably from 1% to 10% by weight), with respect to the resin. Waxes, such as ester waxes, amide waxes, hydrocarbon waxes, can be added in amounts from 0.1% to 5% by weight.

Other compatible additives such as ethyl cellulose or ethyl hydroxy cellulose may be used to promote ink film adhesion, scuff resistance, gloss, etc. The printing inks are preferably used without plasticizers, although the latter can be added to achieve special effects.

Suitable substrates are those conventionally used in intaglio printing, such as paper, cellophane and metal films, e.g. aluminium film.

The present invention is further illustrated by the following Examples in which all parts and percentages are "by weight" unless otherwise indicated. For the avoidance of doubt, the examples are non-limiting on the scope of the invention.

Preparation of Precursors

EXAMPLE A 3,6-Bis(4'-methylphenylsulfonyloxy) phthalonitrile

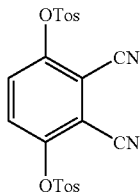

p-Toluenesulfonyl chloride (25.80 g, 135 mmol) was added to a suspension of 2,3-dicyanohydroquinone (10.00 g, 62.5 mmol) and potassium carbonate (34.50 g, 250 mmol) in acetone (75 mL). The temperature of the flask rose rapidly, which stabilised after 2 minutes. The mixture was then heated to reflux and stirred for 2 hours. TLC (eluting: $CH_2Cl_2$) indicated that all the starting 2,3-dicyanohydroquinone had been consumed. The mixture was allowed to cool to room temperature, and was poured into water (200 mL), and the mixture stirred for 1 hour. Filtration gave the title compound (Product A) as a colourless solid, which was washed with more water (~30 mL) and pulled dry. The solid was then dried in an oven (28.36 g, 97%). This material was used without further purification. [Found: C, 55.8%; H, 3.3%; N, 6.0%; S, 13.5%; $C_{22}H_{16}O_6N_2S_2$ requires C, 56.4%; H, 3.4%; N, 6.0%; S, 13.7%]; MS (EI$^+$) 468 (M$^+$, 80%), 155 ($CH_3C_6H_4SO_2$, 100%), 91 ($CH_3C_6H_4$, 90%).

General Method for the Preparation of 3,6-bis(arylthio) phthalonitriles

Thiol (2 equivs) and potassium carbonate (2 equivs) in DMF were stirred at room temperature. Ditosylated dicyanohydroquinone (1 equiv) was then added portionwise. The mixture was then stirred for 4 hours. TLC (eluting: 30% ethyl acetate:isohexane) indicated that all the starting ditosylated dicyanohydroquinone had been consumed. The mixture was then poured into water (100 mL). The mixture was extracted with ethyl acetate (3×30 mL), the organic extracts were combined, dried over $MgSO_4$, filtered and concentrated to give a semisolid. The crude product was then purified as described below.

EXAMPLE B1

3,6-Bis(4'-methylphenylthio) phthalonitrile

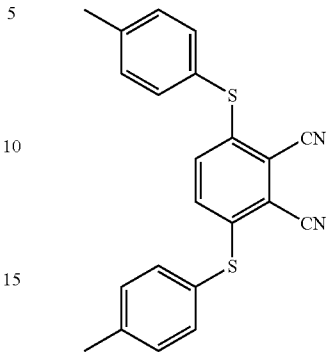

4-Methylthiophenol (3.41 g, 27.5 mmol), potassium carbonate (3.80 g, 27.5 mmol) and ditosylated dicyanohydroquinone (i.e. product A) (5.00 g, 10.7 mmol) in DMF (40 mL) were reacted as described above. The mixture was isolated as described above to give a yellow solid. The solid was purified by flash column chromatography (gradient elution: 5%-10%-30% ethyl acetate:isohexane, finally dichloromethane) to give the title compound as a yellow solid (2.07 g, 52%). [Found: C, 69.9%; H, 4.4%; N, 7.3%; S, 16.9%; $C_{22}H_{16}N_2S_2$ requires C, 70.9%, H, 4.3%, N, 7.5%, S, 17.2%]; MS (EI$^+$) 372 (M$^+$, 100%), 357 (M-$CH_3$, 5%), 123 ($CH_3C_6H_4S$, 15), 91 ($CH_3C_6H_4$, 15).

EXAMPLE B2

3,6-Bis(4'-(prop-2"-yl)phenylthio) phthalonitrile

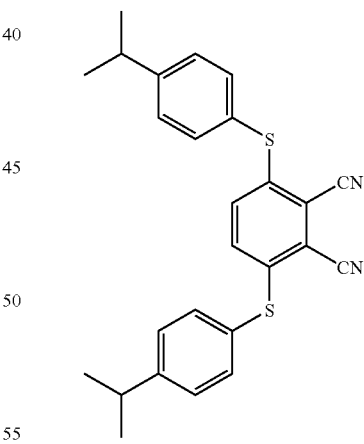

Prop-2'-ylthiophenol (5.0 g, 32.9 mmol), potassium carbonate (2.27 g, 16.4 mmol) and ditosylated dicyanohydroquinone (7.70 g, 16.4 mmol) in DMF (40 mL) were reacted as described above. The mixture was isolated as described above to give a yellow solid. The solid was purified by recrystallisation from ethyl acetate to give the title compound as a yellow solid (2.07 g, 52%).[Found: C, 72.5%; H, 4.8%; N, 6.5%; S, 14.9%; $C_{26}H_{24}N_2S_2$ requires C, 72.8%, H, 5.6%, N, 6.5%, S, 15.0%]; MS (EI$^+$) 428 (100%, M$^+$), 413 (M-$CH_3$, 94).

EXAMPLE B3

3,6-Bis(4'-naphthalene-2"-thio) phthalonitrile

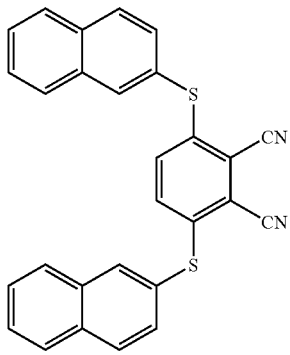

Naphthalene-2-thiol (27.90 g, 174 mmol), potassium carbonate (24.00 g, 174 mmol) and ditosylated dicyanohydroquinone (40 g, 85 mmol) in DMF (120 mL) were reacted as described above. The mixture was isolated as described above to give the crude product. The solid was purified by flash column chromatography (gradient elution: 30%-50%-70% dichloromethane:isohexane, finally dichloromethane) to give the title compound as an off-white solid (2.07 g, 4.7 mmol, 5%).[Found: C, 75.3%; H, 3.5%; N, 6.2%; S, 14.3%; $C_{28}H_{16}N_2S_2$ requires C, 75.6%, H, 3.6%, N, 6.3%, S, 14.4%]; MS (EI$^+$) 444 (M$^+$, 100%)

EXAMPLE B4

3,6-Bis(phenylthio) phthalonitrile

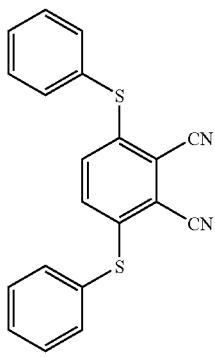

Thiophenol (11.75 g, 107 mmol), potassium carbonate (14.74 g, 107 mmol) and ditosylated dicyanohydroquinone (25.00 g, 53.0 mmol) in DMF (80 mL) were reacted as described above. Water (100 mL) was added and the mixture stirred for 1 hour then filtered. The filter cake was purified by flash column chromatography (gradient elution 10%-30% ethyl acetate:isohexane) to give the title compound as a yellow solid (5.53 g, 16.1 mmol, 52%). [Found: C, 69.6%; H, 3.5%; N, 8.2%; S, 18.3%; $C_{20}H_{12}N_2S_2$ requires C, 69.8%; H, 3.5%; N, 8.1%; S, 18.6%]; MS (EI$^+$) 344 (M$^+$, 100%).

EXAMPLE B5

3,6-Bis(2'-methylphenylthio) phthalonitrile

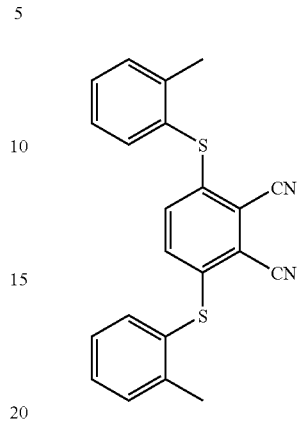

2-Methylthiophenol (10.60 g, 85.5 mmol), potassium carbonate (11.82 g, 82.0 mmol) and ditosylated dicyanohydroquinone (20.00 g, 42.7 mmol) in DMF (75 mL) were reacted as described above. The mixture was isolated as described above to give a yellow oil. The material was purified by flash column chromatography (eluting 10% ethyl acetate:isohexane) to give the title compound as a yellow solid (8.85 g, 23.8 mmol, 42%). [Found: C, 70.7%; H, 4.6%; N, 7.5%; S, 17.2%; $C_{22}H_{16}N_2S_2$ requires C, 70.9%; H, 4.3%; N, 7.5%; S, 17.2%]; MS (EI$^+$) 372 (M$^+$, 100%), 357 (M-CH$_3$, 8), 339 (20).

EXAMPLE B6

3,6-Bis(2'-chlorophenylthio) phthalonitrile

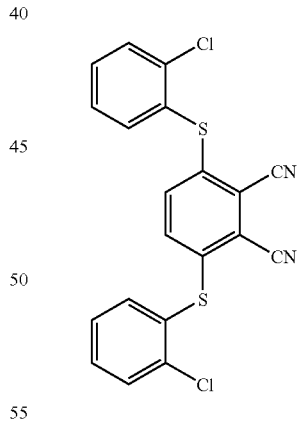

2-Chlorothiophenol (12.50 g, 86.5 mmol), potassium carbonate (11.94 g, 86.5 mmol) and ditosylated dicyanohydroquinone (20.36 g, 43.5 mmol) in DMF (80 mL) were reacted as described above. Water (100 mL) was added and the mixture stirred for 1 hour then filtered. The filter cake was purified by flash column chromatography (eluting 30% ethyl acetate:isohexane) to give the title compound as a yellow solid (5.53 g, 13.4 mmol, 31%) [Found: C, 58.1%; H, 2.7%; N, 6.9%; S, 15.4%; Cl 16.6%; $C_{20}H_{10}N_2S_2Cl_2$ requires C, 58.1%; H, 2.4%; N, 6.8%; S, 15.5%; Cl 17.2%]; MS (EI$^+$) 412 (M$^+$, 100%)

Preparation of dilithium phthalocyanines

General Procedure for the Preparation of dilithium octa-3,6-(arylthio) phthalocyanines Lithium metal (removed from a piece immersed in paraffin oil) (0.5 equivs) was added to a flask containing 3-methylbutanol (isopentanol) and stirred until all the lithium metal had reacted. Then the 3,6-thioaryl substituted phthalonitrile (1 equiv) was added and the mixture heated to 120° C. for 18 hours. Methanol (100 mL) was then added and the mixture stirred for 1 hour. This was then filtered, the cake washed with a little more methanol and pulled dry to give the product. These materials were then used without further purification.

EXAMPLE C1

Dilithium octa-3,6-(4'-methylphenylthio)phthalocyanine

Lithium metal (0.14 g, 20.0 mmol), 3,6-bis(4'-methylphenylthio) phthalonitrile (Example B1) (15.0 g, 40.3 mmol) in 3-methylbutanol (50 mL) were reacted together and isolated as described above to give the title compound as a green-brown solid (11.46 g, 7.63 mmol, 76%).

EXAMPLE C2

Dilithium octa-3,6-(4'-(prop-2"-yl)phenylthio)phthalocyanine

Lithium metal (0.04 g, 5.84 mmol), 3,6-bis(4'-methylphenylthio) phthalonitrile (Example B2) (5.0 g, 11.68 mmol) in 3-methylbutanol (15 mL) were reacted together and isolated as described above to give the title compound as a green-brown solid (3.20 g, 1.85 mmol, 63%).

EXAMPLE C3

Dilithium octa-3,6-(2'-naphthalenethio)phthalocyanine

Lithium metal (0.008 g, 1.14 mmol), 3,6-bis(2'-naphthalenethio) phthalonitrile (Example B3) (1.0 g, 2.25 mmol) in 3-methylbutanol (isopentanol) (50 mL) were reacted together and isolated as described above to give the title compound as a green-brown solid (0.60 g, 0.34 mmol, 60%).

EXAMPLE C4

Dilithium octa-3,6-(phenylthio)phthalocyanine

Lithium metal (0.14 g, 20.0 mmol), 3,6-bis(phenylthio) phthalonitrile (Example B4) (13.76 g, 40.0 mmol) in 3-methylbutanol (40 mL) were reacted together and isolated as described above to give the title compound as a green-brown solid (11.18 g, 8.0 mmol, 80%).

EXAMPLE C5

Dilithium octa-3,6-(2'-methylphenylthio)phthalocyanine

Lithium metal (0.08 g, 11.5 mmol), 3,6-bis(2'-methylphenylthio) phthalonitrile (Example B5) (8.56 g, 23.0 mmol) in 3-methylbutanol (25 mL) were reacted together and isolated as described above to give the title compound as a green-brown solid (6.37 g, 4.2 mmol, 73%).

EXAMPLE C6

Dilithium octa-3,6-(2'-chlorophenylthio)phthalocyanine

Lithium metal (0.07 g, 10.0 mmol), 3,6-bis(2'-chlorophenylthio) phthalonitrile (Example B6) (8.26 g, 20.0 mmol) in 3-methylbutanol (25 mL) were reacted together and isolated as described above to give the title compound as a green-brown solid (6.60 g, 4.0 mmol, 80%).

Preparation of oxymetal phthalocyanin

General Method for the Formation of vanadyloxy phthalocyanines

Dilithium phthalocyanine (1 equiv) and vanadium trichloride (1 equiv) in quinoline were heated to 200° C. After 2 hours the mixture was analysed by UV/Vis spectroscopy. More vanadium trichloride (up to 2 equivs) was added and the mixture maintained at 200° C. until the absorbance at the peak wavelength of the product, as measured by UV/VIS spectrophotometry, had reached a maximum. The reaction mixture was allowed to cool to room temperature. The material was then isolated by one of two methods (A and B) as described below.

Isolation Method A

Dichloromethane (100 mL) was added to the reaction mixture and the mixture was then filtered. The filtered solution was poured into water (100 mL) and the organic layer was separated. The aqueous layer was extracted with dichloromethane (3×30 mL). Methanol was added (50 mL) and the dichloromethane was removed via rotary evaporation. The mixture was then filtered, washed with more methanol until the washings were colourless. The filter cake was then pulled dry to obtain the product.

Isolation Method B

Methanol was added to the reaction mixture and stirred for 1 hour. The mixture was then filtered, washed with more methanol until the washings were colourless. The filter cake was then washed sequentially with water and methanol and pulled dry.

EXAMPLE D1

Vanadyloxy octa-3,6-(4'-methylphenylthio)phthalocyanine

Dilithium octa-3,6-(4'-methylphenylthio)phthalocyanine (Example C1) (10.0 g, 6.66 mmol) and vanadium trichloride (2.10 g, 13.4 mmol) in quinoline (60 mL) were reacted together as described above. Isolation by method A gave the title compound as a dark purple/black solid (5.92 g, 3.81 mmol, 57%). MS (FAB$^+$) 1556 (MH$^+$); UV/VIS solution $\lambda_{max}$ 851 nm, $\epsilon_{molar}$ 163000.

This material was then purified by flash column chromatography (eluting: $CH_2Cl_2$). UV/VIS solution $\lambda_{max}$ 851 nm, $\epsilon_{molar}$ 174356; paper $\lambda_{max}$ 872 nm. The solution $\lambda_{max}$ data was recorded using a solution of the material in dichloromethane. The paper $\lambda_{max}$ was recorded after coating the material onto paper. The material was coated onto common office paper by means of a 0.4% w/v solution of the material in dichloromethane and using a gravure coater.

EXAMPLE D2

Vanadyloxy octa-3,6-(4'-(prop-2"-yl)phenylthio) phthalocyanine

Dilithium octa-3,6-(4'-(prop-2"-yl)phenylthio)phthalocyanine (Example C2) (3.00 g, 1.74 mmol) and vanadium trichloride (0.55 g, 3.5 mmol) in quinoline (30 mL) were reacted together as described above. Isolation by method A gave the title compound as a dark purple/black solid (2.00 g, 1.12 mmol, 65%). MS (MALDI$^+$) 1781 (M+H$^+$); UV/VIS $\lambda_{max}$ 851 nm This material was then purified by flash column chromatography (eluting: CH$_2$Cl$_2$). UV/VIS solution $\lambda_{max}$, 851 nm, $\epsilon_{molar}$ 185968; paper $\lambda_{max}$ 862 nm.

EXAMPLE D3

Vanadyloxy octa-3,6-(2'-naphthalenethio)phthalocyanine

Dilithium octa-3,6-(2'-napthalenethio)phthalocyanine (Example C3) (0.20 g, 0.11 mmol) and vanadium trichloride (0.02 g, mmol) in quinoline (5 mL) were reacted together as described above. Isolation by method A gave the title compound as a dark purple/black solid (0.13 g, 0.07 mmol, 62%). MS (MALDI$^+$) 1845; UV/VIS $\lambda_{max}$ 845 nm.

This material was then purified by flash column chromatography (eluting: CH$_2$Cl$_2$). UV/VIS solution $\lambda_{max}$ 845 nm, $\epsilon_{molar}$ 182171; paper $\lambda_{max}$ 861 nm.

EXAMPLE D4

Vanadyloxy octa-3,6-(phenylthio)phthalocyanine

Dilithium octa-3,6-(phenylthio)phthalocyanine (Example C4) (11.12 g, 8.0 mmol) and vanadium trichloride (2.52 g, 16 mmol) in quinoline (50 mL) were reacted together as described above. Isolation by method B gave the title compound as a dark purple/black solid (10.55 g, 7.3 mmol, 93%). MS (MALDI$^+$) 1444 (MH$^+$); UV/VIS X$_{max}$ 843 nm, $\epsilon_{molar}$ 155851.

This material was then purified by flash column chromatography (eluting: CH$_2$Cl$_2$). UV/VIS solution $\lambda_{max}$, 843 nm, $\epsilon_{molar}$ 167416; paper $\lambda_{max}$ 857 nm.

EXAMPLE D5

Vanadyloxy octa-3,6-(2'-methylphenylthio)phthalocyanine

Dilithium octa-3,6-(2'-methylphenylthio)phthalocyanine (Example C5) (6.31 g, 4.2 mmol) and vanadium trichloride (1.32 g, 8.4 mmol) in quinoline (30 mL) were reacted together as described above. Isolation by method B gave the title compound as a dark purple/black solid (6.40 g, 4.1 mmol, 98%). MS (MALDI$^+$) 1556 (MH$^+$); UV/VIS $\lambda_{max}$ 851 nm, $\epsilon_{molar}$ 156872

This material was then purified by flash column chromatography (eluting: CH$_2$Cl$_2$). UV/VIS solution $\lambda_{max}$ 851 nm, $\epsilon_{molar}$ 173363; paper $\lambda_{max}$ 865 nm.

EXAMPLE D6

Vanadyloxy octa-3,6-(2'-chlorophenylthio)phthalocyanine

Dilithium octa-3,6-(2'-chlorophenylthio)phthalocyanine (Example C6) (6.50 g, 3.9 mmol) and vanadium trichloride (1.23 g, 7.8 mmol) in quinoline (30 mL) were reacted together as described above. Isolation by method B gave the title compound as a dark purple/black solid (7.10 g, 3.7 mmol, 95%). MS (MALDI$^+$) 1720 (MH$^+$); UV/VIS $\lambda_{max}$ 829 nm, $\epsilon_{molar}$ 145424.

This material was then purified by flash column chromatography (eluting: CH$_2$Cl$_2$). UV/VIS solution $\lambda_{max}$ 829 nm, $\epsilon_{molar}$ 168842; paper $\lambda_{max}$ 840 nm.

The UV/VIS spectral data of the materials is summarised in the Table below:

| Compound | $\lambda_{max}$ in CH$_2$Cl$_2$ (nm) | E$_{max}$ | Bandwidth at Half Peak Height (nm) |
|---|---|---|---|
| 3,6-(S-4-methylphenyl)$_8$VOPc | 850 | 174,356 | 50 |
| 3,6-(S-2-methylphenyl)$_8$VOPc | 851 | 173,363 | 56 |
| 3,6-(S-2-chlorophenyl)$_8$VOPc | 829 | 168,842 | 56 |
| 3,6-(S-4-methylphenyl)$_8$TiOPc | 850 | 171,876 | 55 |
| 3,6-(S-2-naphthyl)$_8$VOPc | 845 | 182,171 | 55 |
| 3,6-(S-phenyl)$_8$VOPc | 843 | 167,416 | 42 |
| 3,6-(S-4-isopropylylphenyl)$_8$VOPc | 851 | 185,968 | 47 |

Alternative Preparation Methods

EXAMPLE E1

Octa-3,6-chloro dihydrophthalocyanine 3,6-dichlorophthalic anhydride (48.8 g, 225 mmol), urea (66.6 g, 1110 mmol) and ammonium molybdate (0.2 g, 1.02 mmol) in 1,2,4-trichlorobenzene (180 mL) were heated to 155° C. for 3 hours. Antimony (10.3 g, 85 mmol) and ammonium chloride (13.54 g, 253 mmol) were then added. The mixture was then heated to 200° C. and stirred at this temperature for 6 hours. The mixture was then allowed to cool to room temperature. Ethanol (200 mL) was then added and the mixture stirred at reflux for 1 hour. The mixture was filtered, then the filtered solid was repeatedly added to refluxing ethanol (300 mL) and filtered (2 times). The solid material was then repeatedly added to conc. HCl (100 mL) and filtered (2 times). The solid was finally added to more ethanol (200 mL), filtered and dried in an oven to give the product as a blue solid (18.2 g, 23 mmol, 41%).

EXAMPLE E2

Octa-3,6-(4-methylphenylthio) dihydro phthalocyanine 4-methythiophenol (5.21 g, 42 mmol) and potassium hydroxide (2.35 g, 42 mmol) in quinoline (15 mL) were heated to 120° C. for 30 minutes. Octa-3,6-chloro dihydrophthalocyanine (product of Example E1) (3.30 g, 4.2 mmol) was then added and the mixture heated at 170° C. for 1.5 hours. The mixture was allowed to cool to room temperature. Methanol (30 mL) was added, the mixture was stirred for 30 minutes, then filtered and washed with a little more methanol. The filtered solid was stirred with water (50 mL), filtered and washed with methanol and pulled dry. Soxhlet extraction (CH$_2$Cl$_2$) gave, after concentration, the title compound as a brown solid (3.37 g, 2.3 mmol, 55%) This metal-free phthalocyanine can be converted to a metaloxy containing species by methods known in the art. For example, the Octa-3,6-(4-methylphenylthio)-H$_2$Pc is convertible to the lithium analogue octa-3,6-(4-methylphenylthio)-Li$_2$Pc using the method of V. M. Negrimovskii, M. Bouvet, E. A. Luk'yanets and J. Simon (see J. Porphyrins Phthalocyanines, 4, 248 [2000]) and thence into the vanadyloxy analogue by the method set out in Examples D1-D6 above.

EXAMPLE F

Titanyloxy octa-3,6-(4'-methylphenylthio)phthalocyanine

The analogous titanyloxy phthalocyanines can be prepared using the following method, illustrated with respect to titanyloxy octa-3,6-(4'-methylphenylthio)phthalocyanine.

3,6-Bis(4'-methylphenylthio) phthalonitrile (1.0 g, 2.69 mmol), titanium (IV) butoxide (0.23 g, 0.68 mmol) and urea (0.16 g, 2.60 mmol) in 1-octanol (5 mL) were stirred under nitrogen at 150° C. for 13 hours. The mixture was allowed to cool, then methanol (20 mL) was added and the mixture heated to reflux for 2 hours. The mixture was allowed to cool and was then filtered on a Buchner funnel, washed with methanol and pulled dry. The solid was then added to a flask containing water (20 mL) and stirred for 45 minutes. The mixture was then filtered on a Buchner funnel, washed with water and methanol and pulled dry (0.77 g, 0.49 mmol, 73%).

MS (MALDI$^+$) 1553 (MH$^+$)

This material was then purified by flash column chromatography (eluting: CH$_2$Cl$_2$). UV/VIS solution $\lambda_{max}$ 850 nm, $\epsilon_{molar}$ 171876; paper $\lambda_{max}$ 873 nm Evaluation of Lightfastness

EXAMPLE 1

The lightfastness of compounds of the invention were compared to that of the closest known prior art compound, disclosed in the list on page 5 of EP 0155780, octa-3,6-(4+butylphenylthio)-VOPc.

Test images were prepared from 0.4% w/v dichloromethane solutions of each IRA by coating on to paper, with a Gravure printer, to give an OD of 0.6 for each image. Fading experiments were performed in an Atlas Ci5000 weatherometer (temp: 63° C., humidity: 40%). Absorbance spectra were measured before and after 24 hours exposure, using a Perkin-Elmer Lambda 19 UV/Vis/NIR spectrophotometer fitted with an integrating sphere device, and the extent of fading for each compound (difference between original absorption at $\lambda_{max}$ and absorption after 24 hours exposure as a percentage of the original absorption) is set out in Table 1

TABLE 1

| Compound | $\lambda_{max}$ (nm) | % Fade after 24 h |
|---|---|---|
| Octa-3,6-(4-methylphenylthio)-VOPc | 872 | 44 |
| Octa-3,6-(phenylthio)-VOPc | 857 | 45 |

TABLE 1-continued

| Compound | $\lambda_{max}$ (nm) | % Fade after 24 h |
|---|---|---|
| Octa-3,6-(2-methylphenylthio)-VOPc | 865 | 45 |
| Octa-3,6-(2-chlorophenylthio)-VOPc | 840 | 29 |
| Octa-3,6-(2-naphthylthio)-VOPc | 861 | 16 |
| Prior Art: | | |
| Octa-3,6-(4-t-butylphenylthio)-VOPc | 852 | 63 |

It can clearly be seen from Table 1 that the compounds of the invention exhibit significantly improved lightfastness.

Evaluation of Thermal Stability

EXAMPLE 2

The thermal stability of compounds of the invention were compared to that of the same prior art compound used in Example 1.

Thermogravimetric analysis was performed on a Perkin-Elmer TGA7 analyser by heating a sample of each compound from room temperature to 450° C. at 10° C./minute and the trigger point, for the onset of thermal decomposition, of each compound is set out in Table 2 below.

TABLE 2

| Compound | Trigger Point (° C.) |
|---|---|
| Octa-3,6-(4-methylphenylthio)-VOPc | 340 |
| Octa-3,6-(phenylthio)-VOPc | 345 |
| Octa-3,6-(2-methylphenylthio)-VOPc | 340 |
| Octa-3,6-(2-chlorophenylthio)-VOPc | 365 |
| Octa-3,6-(2-naphthylthio)-VOPc | 330 |
| Prior art: | |
| Octa-3,6-(4-t-butylphenylthio)-VOPc | 282 |

Examples of Ink Formulations Incorporating the Present Invention

The following ink formulations may be used in security printing inks:

| Lithographic printing ink formulation containing V = O-3,6-(4-methylphenylthio)$_8$Pc | |
|---|---|
| Phenolic resin modified with bisphenol A epoxide | 46% |
| C.I. Pigment Blue 15:3 | 30.2% |
| Teflon | 7% |
| Bodied Tung Oil | 10% |
| Co/Mn drier | 2% |
| Infrared absorber [V = O-3,6-(4-methylphenylthio)$_8$Pc] | 0.5% |
| BHT(antioxidant) | 2% |
| Hydrocarbon solvent (Magie 470) | 2.3% |

| Intaglio ink formulation containing V = O-3,6-(4-methylphenylthio)$_8$Pc | |
|---|---|
| Resin | 50% |
| Amine or phenolic antioxidant | 0.5% |
| Toluene/Xylene/Lactol solvent | 24% |
| C.I. Pigment Blue 15:3 | 25% |
| Infrared absorber [V = O-3,6-(4-methylphenylthio)$_8$Pc] | 0.5% |

| UV cure ink formulation containing V = O-3,6-(4-methylphenylthio)₈Pc | |
|---|---|
| Isobornyl acrylate | 50% |
| Ethoxylated trimethylol propane triacrylate | 27.5% |
| Propoxylated neopentyl glycol diacrylate | 15% |
| C.I. Pigment Blue 15:3 | 2.5% |
| Infrared absorber [V = O-3,6-(4-methylphenylthio)₈Pc] | 0.5% |
| High molecular weight hyperdispersant | 0.5% |
| 2-ethyl anthraquinone (photoinititiator) | 3.7% |
| Fluoro surfactant | 0.3% |

| Solvent-based inkjet formulation containing V = O-3,6-(4-methylphenylthio)₈Pc | |
|---|---|
| Oil-soluble copper phthalocyanine dye | 3.5% |
| Phenethylcumene | 80% |
| Infrared absorber [V = O-3,6-(4-methylphenylthio)₈Pc] | 0.5% |
| Diethylene glycol hexyl ether | 15% |
| N-butyl-p-toluenesulfonamide | 1% |

Examples of Toners for Security Incorporating the Current Invention

The material of the current invention could be used as an infrared absorbing component in toner for both flash fusion and security properties.

The toner may comprise one or more polymers as the binder resin, such as styrene-acrylic copolymers, styrene-butadiene polymers, polyesters and hydrocarbon resins. Mixtures of polymers can be used, for example where polymers of different molecular weight are used to control the molecular weight distribution and the melt rheology properties of the toner. The toner may also contain colorants, such as pigments or dyes. Magnetic pigments may be used. Charge control agents may be added to the toner, either internally or onto the toner surface. Typical charge control agents include metal complexes (for example where the metal is Zn, Al, Fe or Cr), and polymeric materials (such as phenolic polymers). Waxes may be incorporated into the toner to aid release from the fusion rollers. Such waxes may comprise hydrocarbon waxes (such as paraffin waxes, polyethylene or polypropylene waxes, or waxes made from carbon monoxide and hydrogen, for example Fischer-Tropsch waxes), natural product waxes (e.g. carnauba wax) or synthetic ester or amide waxes. The toner may contain additives on the surface to control flow, charging performance or transfer properties. Such additives may comprise inorganic materials such as silica, titania and alumina, or polymeric particles.

Conventionally Produced Toner:

Example Toner Formulation:

| | |
|---|---|
| Polyester resin ("Tuftone NE1110" from Kao Corporation) | 92% |
| Red pigment ("Lionel Red CP-A" from Toyo Ink K.K.) | 6% |
| Charge controlling agent ("Bontron E84" from Orient Kagaku Kogyo K.K.) | 1% |
| Infrared absorber [V = O-3,6-(4-methylphenylthio)₈Pc] | 1% |

The material of the current invention could be used as an infrared absorbing component of a chemically produced toner.

The invention claimed is:

1. A phthalocyanine compound of Formula I

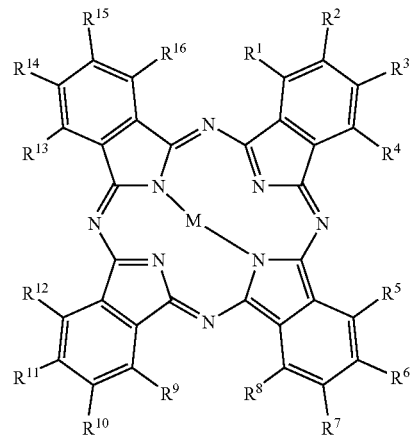

wherein at least the eight groups represented by $R^1$, $R^4$, $R^5$, $R^8$, $R^9$, $R^{12}$, $R^{13}$ & $R^{16}$ which groups are identical are —X-J wherein J is selected from the group consisting of $C_{1-6}$-alkyl; $C_{2-6}$-alkenyl; $C_{4-8}$-cycloalkyl each being optionally substituted by a group selected from the group consisting of $C_{1-4}$-alkoxy, $C_{1-4}$-alkylthio, $C_{6-12}$-aryl, $C_{6-12}$-arylthio, $C_{1-4}$-alkylsulphonyl, $C_{1-4}$-alkylsulphonylamino, $C_{1-4}$-alkylsulphoxide, amino, mono- and di-$C_{1-4}$-alkylamino, halogen, nitro, cyano and hydroxycarbonyl (—COOH), hydroxysulphonyl (—SO₃H) or dihydroxyphosphonyl (—PO₃H₂) or $C_{1-4}$-alkyl esters thereof and from $C_{6-12}$-aryl optionally substituted by a group selected from the group consisting of $C_{1-3}$-alkyl, $C_{1-3}$-alkoxy, $C_{1-3}$-alkylthio, $C_{1-3}$-alkylsulphonyl, $C_{1-3}$-alkylsulphonylamino, $C_{1-4}$-alkylsulphoxide, amino, mono- and di-$C_{1-3}$-alkylamino, halogen, nitro, cyano and hydroxycarbonyl, hydroxysulphonyl or dihydroxyphosphonyl, hydroxycarbonyl-$C_{1-3}$-alkyl, hydroxysulphonyl-$C_{1-3}$-alkyl, dihydroxyphosphonyl-$C_{1-3}$-alkyl or $C_{1-3}$-alkyl esters thereof;

M is an oxymetal group selected from the group consisting of VO, TiO and MoO;

X is S, Se, Te or NT;

T is H, alkyl or phenyl, or T & J, together with the N atom to which they are attached, form an aliphatic or aromatic ring provided this N atom is not positively charged; provided where J is aryl, T is not aryl; and wherein each of $R^2$, $R^3$, $R^6$, $R^7$, $R^{10}$, $R^{11}$, $R^{14}$ and $R^{15}$ is H with the proviso that the compound is not octa-3,6-(phenylthio)VOPc, octa-3,6-(methylthio)TiOPc or octa-3,6-(ethylthio)VOPc.

2. A phthalocyanine compound according claim 1 wherein the compound has an electronic absorption peak from 750 to 1100 nm.

3. A phthalocyanine compound according to claim 2 wherein the compound has an absorption strength in the region above 400 nm and at least 90% of said absorption strength is at or above 750 nm.

4. A phthalocyanine compound according to claim 2 wherein the electronic absorption peak has a band width at half peak height in solution of less than 60 nm.

5. A phthalocyanine compound according to claim 1 wherein J is selected from the group consisting of $C_{3-6}$-alkyl, which may be straight or branched chain; $C_{2-4}$-alkenyl;

cyclohexyl; phenyl; naphtha-1-yl or naphtha-2-yl, each of which is optionally substituted.

6. A phthalocyanine compound according to claim 5 wherein J is an optionally substituted phenyl.

7. A phthalocyanine compound according to claim 5 wherein the substituent(s) for the phenyl; naphtha-1-yl or naphtha-2-yl groups represented by J is(are) independently selected from the group consisting of $C_{1-2}$-alkyl; $C_{1-2}$-alkoxy; $C_{1-2}$-alkylthio; $C_{1-2}$-alkylsulphonyl; $C_{1-2}$-alkylsulphoxide; amino; mono- and di-$C_{1-2}$-alkylamino; halogen; nitro; cyano; hydroxycarbonyl, hydroxysulphonyl, dihydroxy-phosphonyl, hydroxycarbonyl-$C_{1-3}$-alkyl, hydroxysulphonyl-$C_{1-3}$-alkyl and dihydroxy-phosphonyl-$C_{1-3}$-alkyl and $C_{1-2}$-alkyl esters thereof.

8. A phthalocyanine compound according to claim 5 wherein the optionally substituted phenyl; naphtha-1-yl or naphtha-2-yl groups represented by J are selected from the group consisting of phenyl, 4-methylphenyl, 2-methylphenyl, 4-i-propylphenyl, 2 4-dimethyl-phenyl, 2,5-dimethylphenyl, 3,5-dimethylphenyl, 4-methoxyphenyl, 4-methylthiophenol, 3-(2-[methoxycarbonyl]ethyl)phenyl, 3-(hydroxycarbonyl)phenyl, 4-(hydroxysulphonyl)-phenyl, 2-chlorophenyl, 4-bromophenyl, 3,5-dichlorophenyl, naphtha-1-yl and naphtha-2-yl.

9. A phthalocyanine compound according to claim 1 wherein the compound has a formula:

octa-3,6-(RX)-Pc-M            Formula III wherein
M is an oxymetal group selected from the group consisting of VO, TiO and MoO;
Pc is the phthalocyanine nucleus;
X is S, Se, Te or NT wherein T is H, $C_{1-4}$-alkyl or phenyl; and
R is phenyl or naphthyl each of which is optionally substituted by up to 5 groups selected from the group consisting of $C_{1-3}$-alkyl, $C_{1-3}$-alkoxy, $C_{1-3}$-alkylthio, $C_{1-3}$-alkylsulphonyl, $C_{1-3}$-alkylsulphonyl-amino, $C_{1-3}$-alkylsulphoxide, amino, mono- and di-$C_{1-3}$-alkylamino, halogen, nitro, cyano and hydroxycarbonyl, hydroxy-sulphonyl, dihydroxyphosphonyl, hydroxycarbonyl-$C_{1-3}$-alkyl, hydroxysulphonyl-$C_{1-3}$-alkyl or hydroxyphosphonyl-$C_{1-3}$-alkyl or $C_{1-3}$-alkyl esters thereof; or R & T together form a piperidinyl, piperazinyl, morpholinyl or pyrrolinyl ring.

10. A phthalocyanine compound according to claim 1 wherein X is sulphur.

11. A phthalocyanine compound according to claim 1 wherein each of $R^1$, $R^4$, $R^5$, $R^8$, $R^9$, $R^{12}$, $R^{13}$ & $R^{16}$ is 4-methylphenylthio.

12. A phthalocyanine compound according to claim 1 wherein M is VO.

13. A method for detecting an article carrying a superficial image by scanning with an infra-red detector wherein the image comprises a compound of formula I in claim 1 without the proviso that the compound is not octa-3,6-(phenylthio)VOPc, octa-3,6-(methylthio)TiOPc or octa-3,6-(ethylthio)VOPc.

14. An ink comprising a compound of formula I in claim 1 without the proviso that the compound is not octa-3,6-(phenylthio)VOPc, octa-3,6-(methylthio)TiOPc or octa-3,6 (ethylthio) VOPc.

15. An ink according to claim 14 also comprising a colorant.

16. An ink according to claim 14 also comprising an alkoxylated or polyalkoxylated acrylate monomer and a photoinitiator.

17. A method of establishing the authenticity of an article or substrate comprising marking the article or substrate with a mark including a compound according to formula I in claim 1 without the proviso that the compound is not octa-3,6-(phenylthio)VOPc, octa-3,6-(methylthio)TiOPc or octa-3,6-(ethylthio)VOPc and detecting and/or measuring a characteristic absorption of infrared radiation by the mark.

18. The phthalocyanine compound according claim 2 wherein the compound has an electronic absorption peak from 800 to 1000 nm.

19. The phthalocyanine compound according to claim 3 wherein the compound has an absorption strength in the region above 400 nm and at least 95% of said absorption strength is at or above 750 nm.

* * * * *